US012258178B1

(12) United States Patent
Tennar

(10) Patent No.: US 12,258,178 B1
(45) Date of Patent: Mar. 25, 2025

(54) BOTTLE FOR LIQUID FUEL ADDITIVE

(71) Applicant: Lubrication Specialties, LLC, Mt. Gilead, OH (US)

(72) Inventor: Brett Tennar, Edison, OH (US)

(73) Assignee: Lubrication Specialties, LLC, Mt. Gilead, OH (US)

( * ) Notice: Subject to any disclaimer, the term of this patent is extended or adjusted under 35 U.S.C. 154(b) by 0 days.

(21) Appl. No.: 18/372,244

(22) Filed: Sep. 25, 2023

(51) Int. Cl.
*B65D 25/42* (2006.01)
*B65D 25/56* (2006.01)
*B67D 7/00* (2010.01)
*B67D 7/22* (2010.01)
*B67D 7/30* (2010.01)

(52) U.S. Cl.
CPC ............. *B65D 25/42* (2013.01); *B65D 25/56* (2013.01); *B67D 7/005* (2013.01); *B67D 7/22* (2013.01); *B67D 7/30* (2013.01); *B67D 7/301* (2013.01)

(58) Field of Classification Search
CPC ........ B65D 25/40; B65D 25/42; B65D 25/56; B67D 7/005; B67D 7/30; B67D 7/301
See application file for complete search history.

(56) References Cited

U.S. PATENT DOCUMENTS

| | | | |
|---|---|---|---|
| 3,948,105 | A | 4/1976 | Johnson, Jr. |
| 4,646,948 | A | 3/1987 | Jennings |
| 5,447,245 | A | 9/1995 | Merhar |
| 5,556,011 | A | 9/1996 | Jennings |
| D379,063 | S | 5/1997 | Sill, Jr. |
| D398,240 | S | 9/1998 | Willardson |
| D416,803 | S | 11/1999 | Voight et al. |
| D422,919 | S | 4/2000 | Scriven et al. |
| D430,032 | S | 8/2000 | Feen |
| 6,290,102 | B1 | 9/2001 | Jennings |
| D510,028 | S | 9/2005 | Hasler |
| D545,219 | S | 6/2007 | Troost et al. |
| D555,481 | S | 11/2007 | Tseng |
| D557,142 | S | 12/2007 | Karam |
| D564,364 | S | 3/2008 | White et al. |
| 7,467,735 | B2 | 12/2008 | Rau |
| D622,159 | S | 8/2010 | Jennings |
| D654,813 | S | 2/2012 | Jennings |
| 8,440,131 | B2 | 5/2013 | Ishii et al. |

(Continued)

OTHER PUBLICATIONS

International Search Report PCT/US2023/033585 (3 pp.).
Written Opinion of the International Searching Authority PCT/US2023/033585 (8 pp.).

*Primary Examiner* — Timothy L Maust
(74) *Attorney, Agent, or Firm* — Nixon Peabody LLP

(57) ABSTRACT

A fuel-additive dispensing bottle used to dispense a liquid fuel additive into a capless fuel-tank system having a self-sealing mechanism triggered by tabs, the bottle having: a first neck having a circumference, an exterior surface, and an outside diameter between approximately 0.750 inches to approximately 1.19 inches; a first lip having a circumference, the first lip connected to a first distal end of the first neck, the first lip defining screw-cap threading configured for use with a capless fuel-tank system having a self-sealing mechanism triggered by tabs, wherein sections of the screw-cap threading are disrupted with a plurality of substantially planar thread disruptions, the plurality of substantially planar thread disruptions being positioned at regular intervals on the threading; the first neck and first lip configured for insertion into a capless fuel system having a self-sealing mechanism triggered by tabs.

7 Claims, 28 Drawing Sheets

(56) References Cited

U.S. PATENT DOCUMENTS

| | | | |
|---|---|---|---|
| 8,668,120 | B2 | 3/2014 | Hall |
| D706,645 | S | 6/2014 | Jennings |
| 8,974,744 | B2 | 3/2015 | Llewllyn |
| 9,051,073 | B2 | 6/2015 | Jennings |
| D747,976 | S | 1/2016 | Martin |
| D763,695 | S | 8/2016 | Fairclough et al. |
| 9,694,532 | B2 | 7/2017 | McKenzie et al. |
| D794,463 | S | 8/2017 | Turi et al. |
| D807,753 | S | 1/2018 | Alamer et al. |
| D818,829 | S | 5/2018 | Dumortier et al. |
| D835,991 | S | 12/2018 | Veldhuis |
| 11,104,470 | B2 | 8/2021 | Baker |
| 2006/0091153 | A1 | 5/2006 | Evans |
| 2011/0089068 | A1 | 4/2011 | Shin |
| 2011/0127297 | A1 | 6/2011 | Jennings |
| 2011/0204086 | A1 | 8/2011 | Karam |
| 2012/0285579 | A1 | 11/2012 | Dudley et al. |
| 2013/0292425 | A1 | 11/2013 | Mulry et al. |
| 2014/0252039 | A1 | 9/2014 | Jennings |
| 2017/0059383 | A1 | 3/2017 | Melia |
| 2017/0240415 | A1 | 8/2017 | McKenzie |

BOTTLE FOR LIQUID FUEL ADDITIVE

CROSS-REFERENCE TO RELATED APPLICATIONS

None.

BACKGROUND OF THE INVENTION

Liquid-fuel additives are known to improve fuel-performance characteristics, e.g., a fuel's octane rating, corrosion inhibition, lubricity, and combinations thereof. Liquid fuel additives are typically packaged and sold in plastic bottles having an elongated dispensing neck, which facilitates inserting the neck into a conventional fuel-receiving aperture, pouring the liquid additive(s) out of the neck (while the neck is inserted within a conventional fuel-receiving aperture) and ultimately into the fuel tank.

In addition to conventional fuel-receiving apertures that require threaded screw caps, there are also capless fuel-tank systems for both gas-fueled and diesel-fueled vehicles. A capless fuel-tank system does not have a traditional threaded screw cap that needs to be unscrewed before inserting a fuel-pump nozzle. Instead, a capless fuel-tank system typically has a fuel-receiving aperture configured with a spring-loaded flap that opens when a specific fuel-pump nozzle is inserted therein and closes when the fuel-pump nozzle is removed. Quite often, a capless fuel-tank system has a depressible-tab configuration that is designed to only allow entry of fuel-dispensing nozzles of a specific diameter (and thereby prevent entry of items or fuel-dispensing nozzles that are not appropriately sized). In certain capless fuel-tank-system configurations, e.g., diesel capless fuel-tank systems, a depressible-tab configuration can make it challenging for a consumer to insert or remove a conventional, i.e., non-adapted, fuel-additive bottle's elongated neck into the fuel-tank aperture because of its inability to effectively depress the system's tab configuration and thereby allow the neck to enter the fuel-tank aperture.

Furthermore, introducing a specific volume of a fuel additive from its bottle or commercial packaging determines the additive's concentration per unit volume of fuel in the fuel tank. There is therefore a need to control the volume of fuel additive that is poured into a fuel tank.

There therefore remains a need for a liquid fuel-additive bottle configuration that facilitates pouring liquid fuel additive into a capless fuel-tank system in known amounts (to thereby control the concentration of liquid-fuel additive per unit volume of fuel in the fuel tank).

BRIEF SUMMARY OF THE INVENTION

A fuel-additive dispensing bottle used to dispense a liquid fuel additive into a capless fuel-tank system having a self-sealing mechanism triggered by tabs, the bottle having: a first neck having a circumference, an exterior surface, and an outside diameter between approximately 0.750 inches to approximately 1.19 inches; a first lip having a circumference, the first lip connected to a first distal end of the first neck, the first lip defining screw-cap threading configured for use with a capless fuel-tank system having a self-sealing mechanism triggered by tabs, wherein sections of the screw-cap threading are disrupted with a plurality of substantially planar thread disruptions, the plurality of substantially planar thread disruptions being positioned at regular intervals on the threading; the first neck and first lip configured for insertion into a capless fuel system having a self-sealing mechanism triggered by tabs; the first lip describing an orifice configured to allow fluid flow exit therefrom; a first fluid-holding and measuring chamber, wherein the first chamber has at least one visible fixed marking indicating a specified volume of fluid within the first chamber; a second fluid-holding and measuring chamber, wherein the second chamber has at least one visible fixed marking indicating a specified volume of fluid within the second chamber; the first chamber having a greater volume than the second chamber; a fluid conduit that provides a fluid-flow path from the first chamber to a side-fluid-flow entry orifice on the first neck, the fluid conduit having three portions: a first curved distal-end portion, a body portion, and a second curved distal-end portion, wherein the fluid-conduit body portion has a longitudinal axis that is substantially adjacent to and substantially parallel to at least 70% of a longitudinal length of an exterior side-edge portion of the first chamber, wherein the fluid-conduit first curved distal-end portion curves 80° to 100° relative to the fluid-conduit linear-body portion longitudinal axis, wherein the fluid-conduit second curved distal-end portion curves 80° to 100° relative to the fluid-conduit linear-body portion longitudinal axis, the fluid-conduit first curved distal-end portion being connected to a side-edge base portion of the first chamber and configured to allow fluid flow out of the first chamber and into the fluid-conduit first curved distal-end portion; the fluid-conduit second curved distal-end portion connected to the first neck at a side-fluid-flow entry orifice and configured to allow fluid flow out of fluid-conduit second curved distal-end portion and into the first neck; the second chamber connected to a second distal end of the first neck and configured to allow fluid flow out of the second chamber and into the first neck; the first neck having a longitudinal axis that is substantially parallel to the fluid-conduit linear-body portion longitudinal axis; and a second lip connected to a first distal end of a second neck, the second lip defining screw-cap threading, the second lip describing an orifice configured to allow fluid flow entry into the second lip; and the second neck connected to the first chamber and configured to allow fluid flow from the second neck into the first chamber.

A fuel-additive dispensing bottle used to dispense a liquid fuel additive into a capless fuel-tank system having a self-sealing mechanism triggered by tabs, the bottle having: a first neck having a circumference, an exterior surface, and an outside diameter between approximately 0.750 inches to approximately 1.19 inches; a first lip having a circumference, the first lip connected to a first distal end of the first neck, the first lip defining screw-cap threading, wherein sections of the screw-cap threading are disrupted with a plurality of substantially planar thread disruptions, the plurality of substantially planar thread disruptions being positioned at regular intervals on the threading; the first neck and first lip configured for insertion into a capless fuel system having a self-sealing mechanism triggered by tabs; the first lip describing an orifice configured to allow fluid flow exit therefrom; a first fluid-holding and measuring chamber, wherein the first chamber has at least one visible fixed marking indicating a specified volume of fluid within the first chamber; a second fluid-holding and measuring chamber, wherein the second chamber has at least one visible fixed marking indicating a specified volume of fluid within the second chamber; the first chamber having a greater volume than the second chamber; a fluid conduit that provides a fluid-flow path from the first chamber to the second chamber, the fluid conduit having three portions: a first curved distal-end portion, a body portion, and a second curved distal-end portion, wherein the fluid-conduit body portion has a longitudinal axis that is substantially adjacent to and substantially parallel to at least 70% of a longitudinal length of an exterior side-edge portion of the first chamber, wherein the fluid-conduit first curved distal-end portion curves 80° to 100° relative to the fluid-conduit linear-body portion longitudinal axis, wherein the fluid-conduit second curved distal-end portion curves 80° to 100° relative to the fluid-conduit linear-body portion longitudinal axis, the fluid-conduit first curved distal-end portion being connected to a side-edge base portion of the first chamber and configured to allow fluid flow out of the first chamber and into the fluid-conduit first curved distal-end portion; the fluid-conduit second curved distal-end portion being connected to a side edge of the second chamber and configured to allow fluid flow out of the fluid-conduit second curved distal-end portion and into the second chamber; the second chamber connected to a second distal end of the first neck and configured to allow fluid flow out of the second chamber and into the first neck; the first neck having a longitudinal axis that is substantially parallel to the fluid-conduit linear-body portion longitudinal axis; and a second lip connected to a first distal end of a second neck, the second lip defining screw-cap threading, the second lip describing an orifice configured to allow fluid flow entry into the second lip; and the second neck connected to the first chamber and configured to allow fluid flow from the second neck into the first chamber.

DETAILED DESCRIPTION OF THE INVENTION

Figure 1:
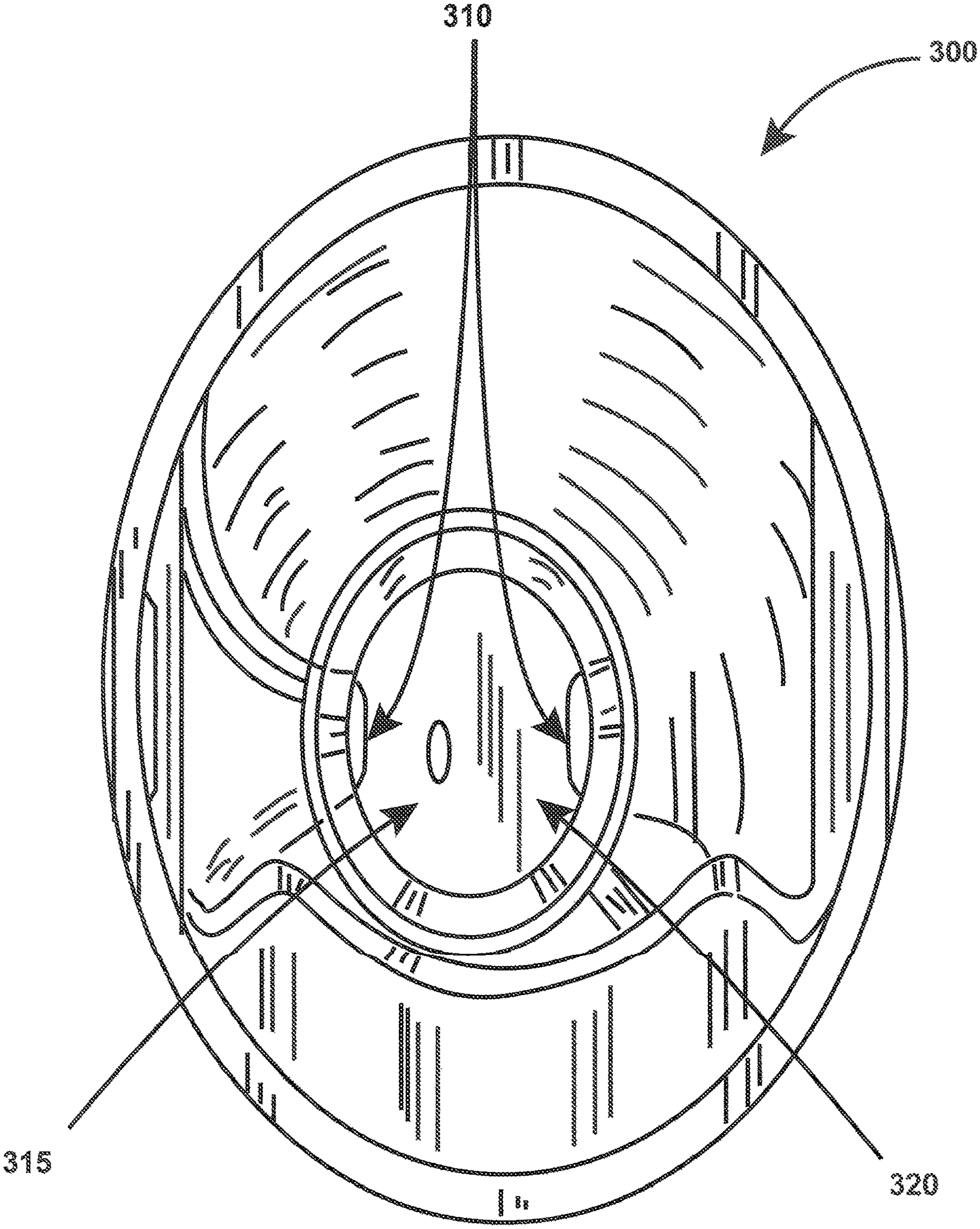
Fig. 01 PRIOR ART
FIG. 1 illustrates a known capless fuel-system configuration.
Figure 2:
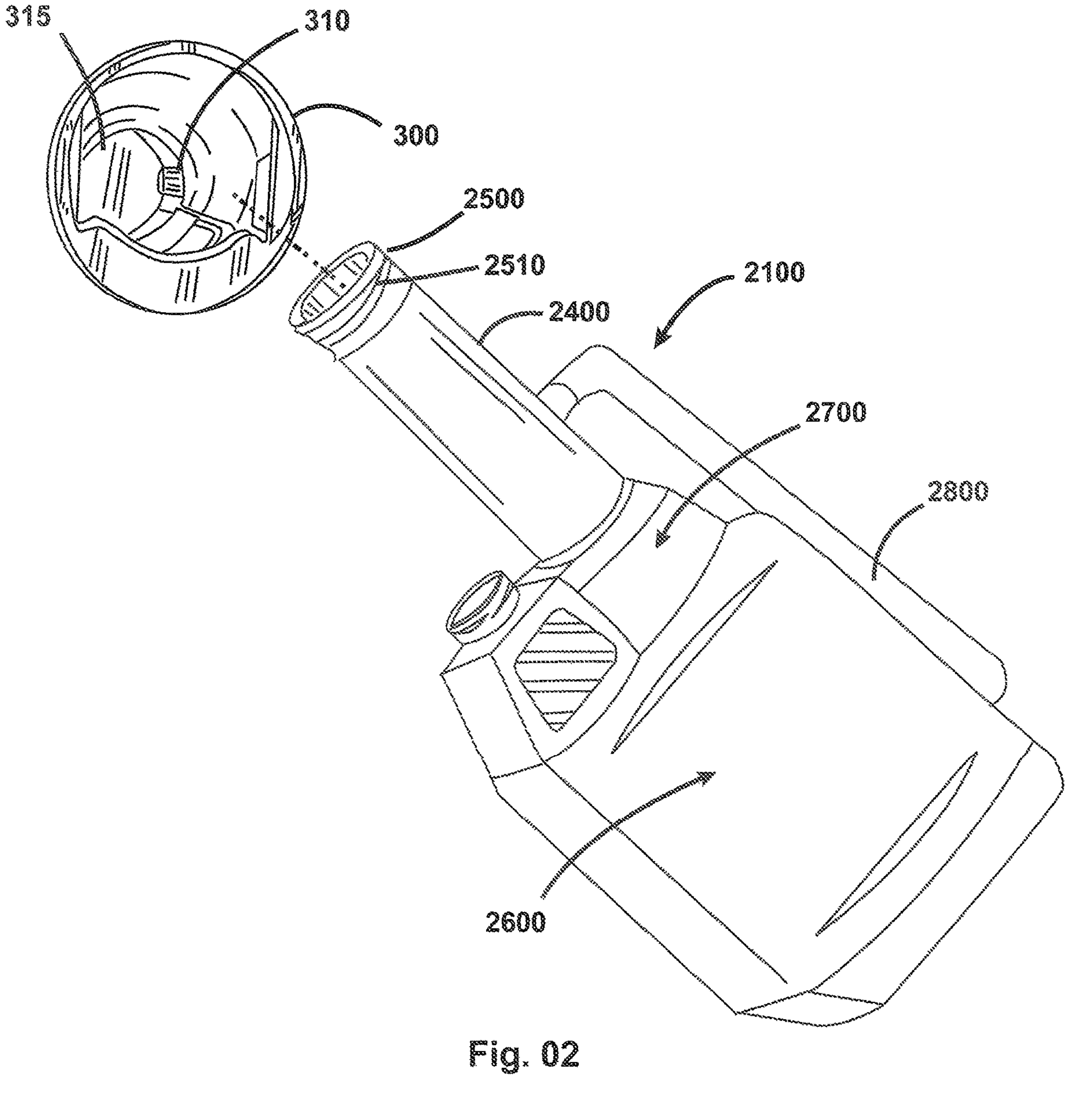
FIG. 2 illustrates a perspective view of a bottle embodiment in use with a capless fuel system.
Figure 3:
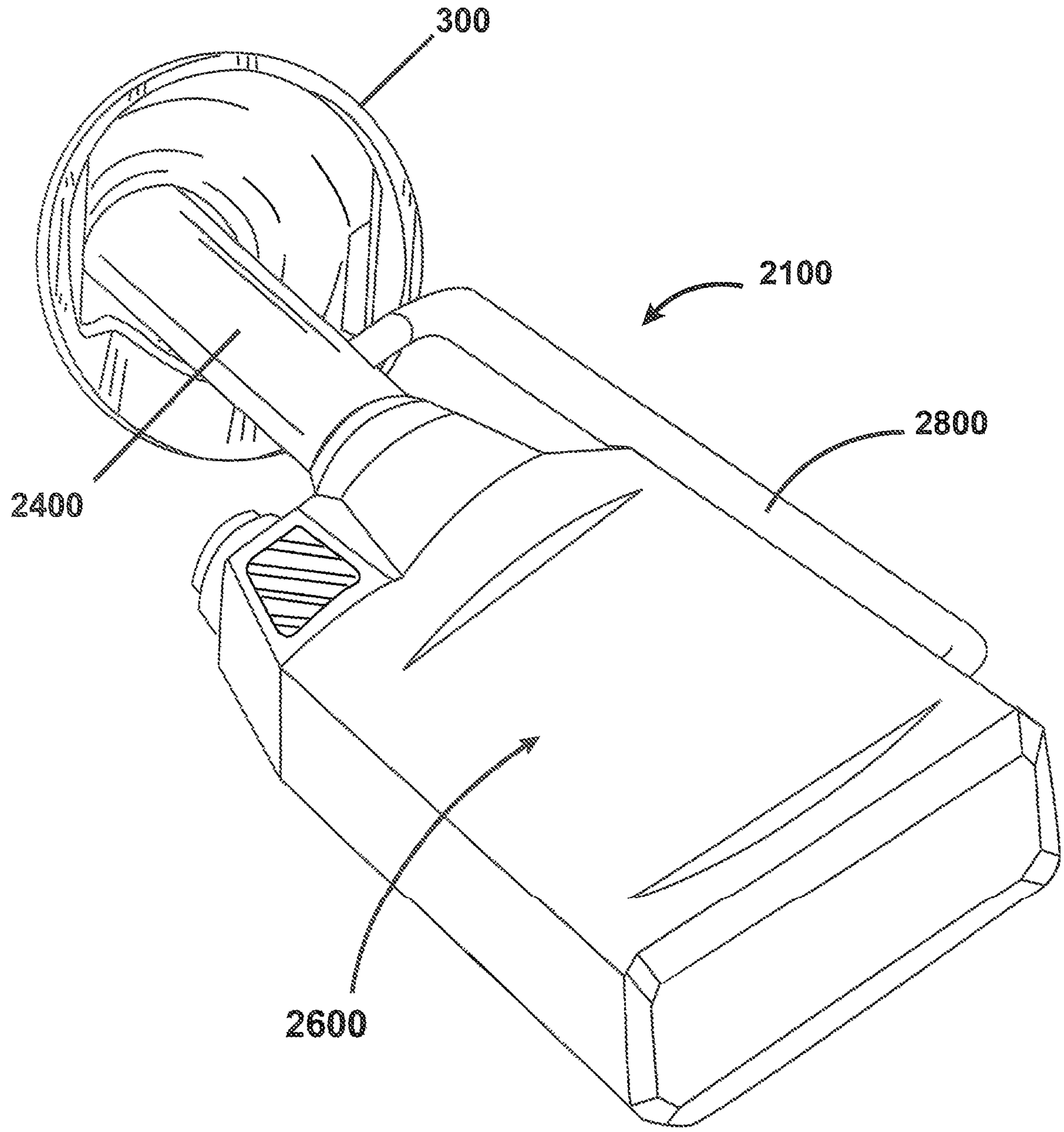
FIG. 3 illustrates a perspective view of a bottle embodiment in use with a capless fuel system.
Figure 4:
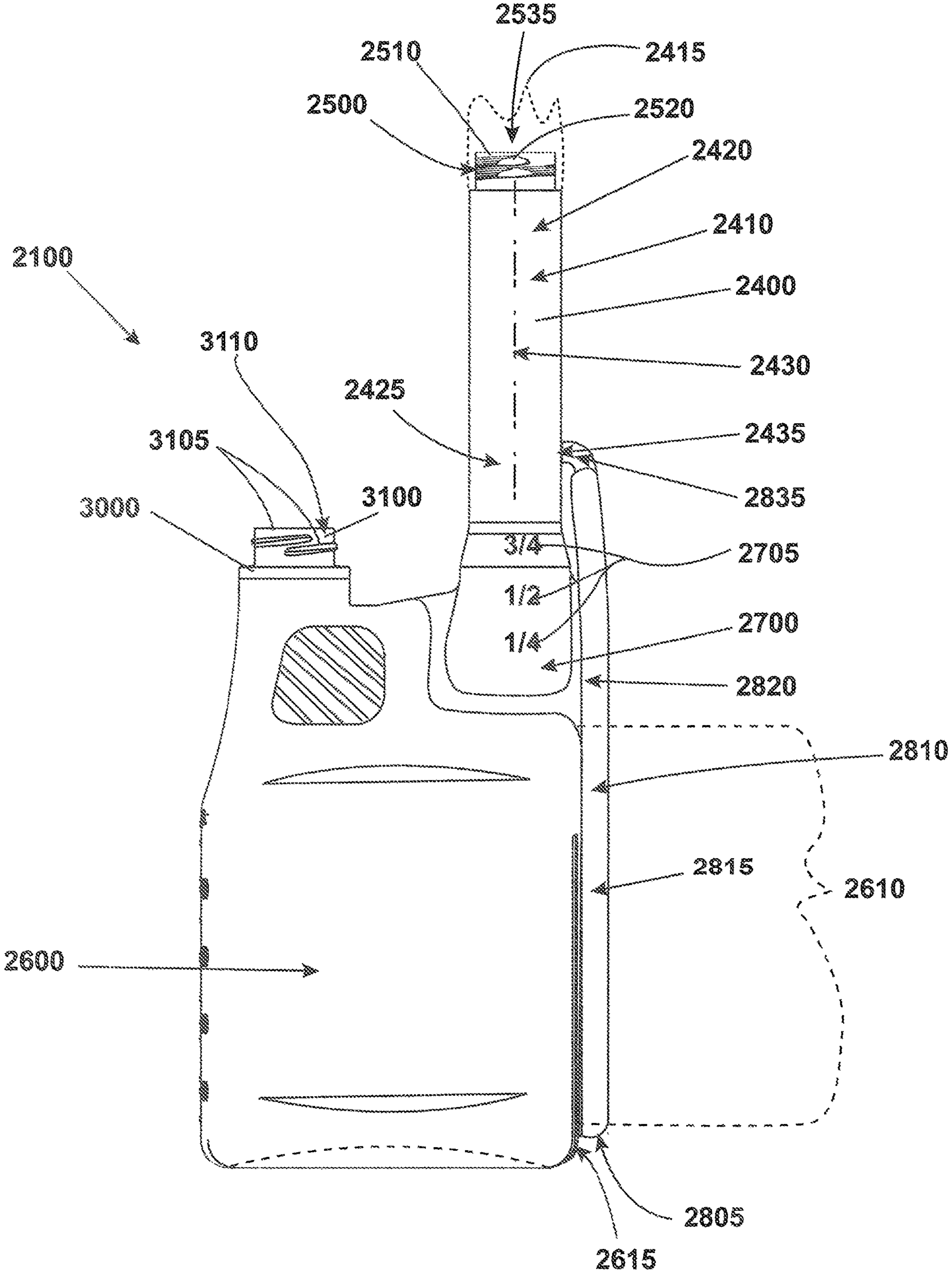
FIG. 4 illustrates a side view of a bottle embodiment.
Figure 5:
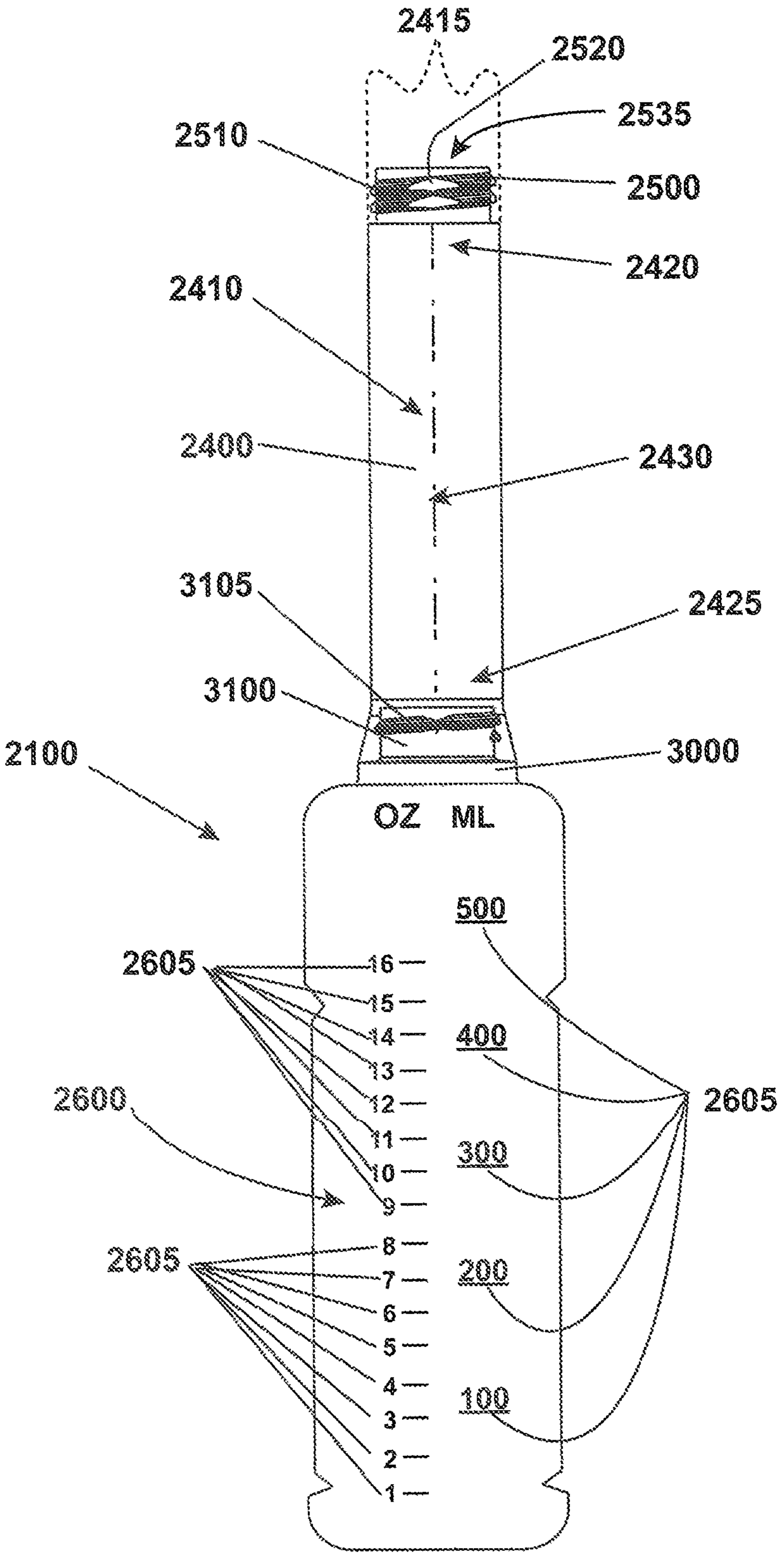
FIG. 5 illustrates a rear view of a bottle embodiment.
Figure 6:
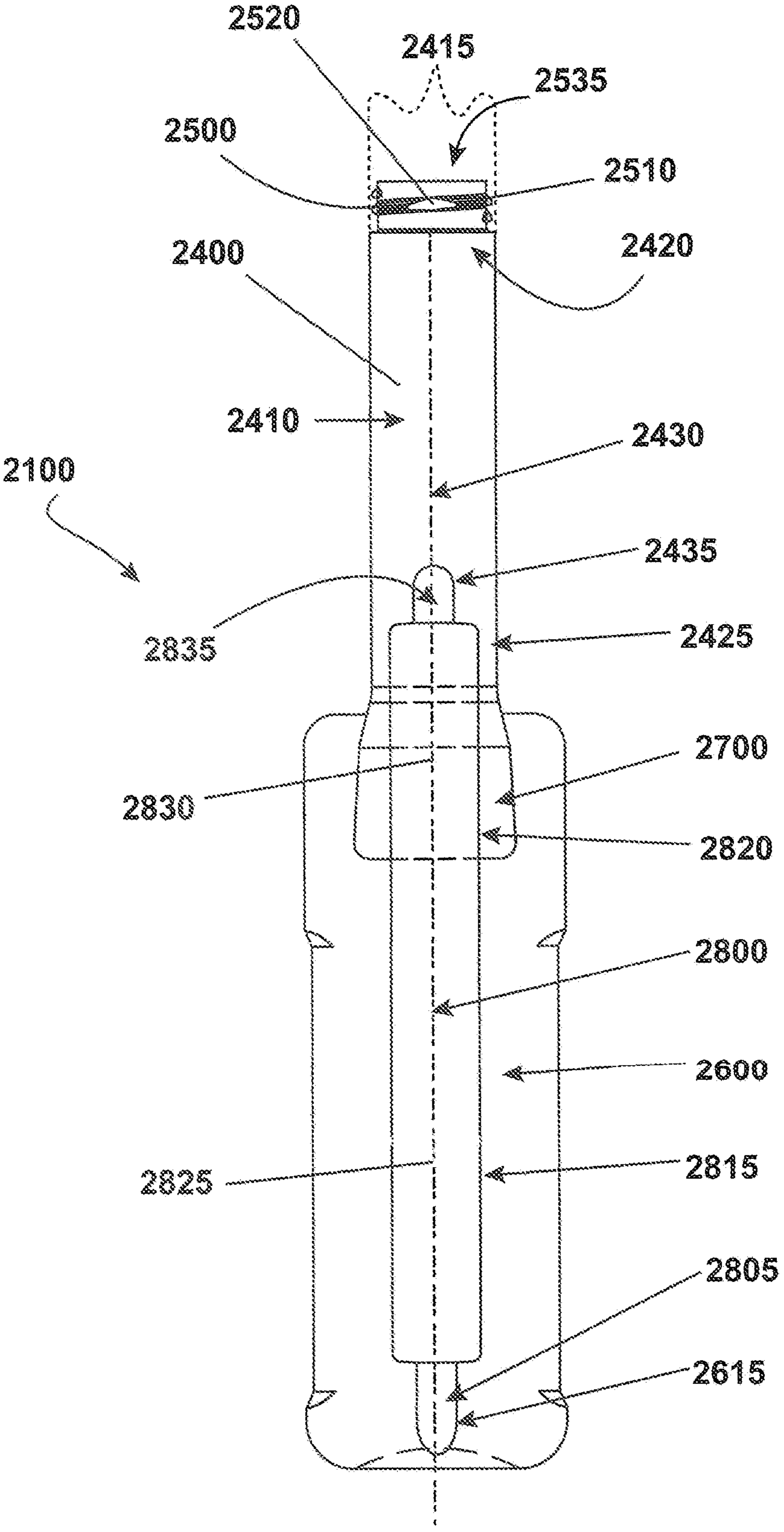
FIG. 6 illustrates a front view of a bottle embodiment.
Figure 7:
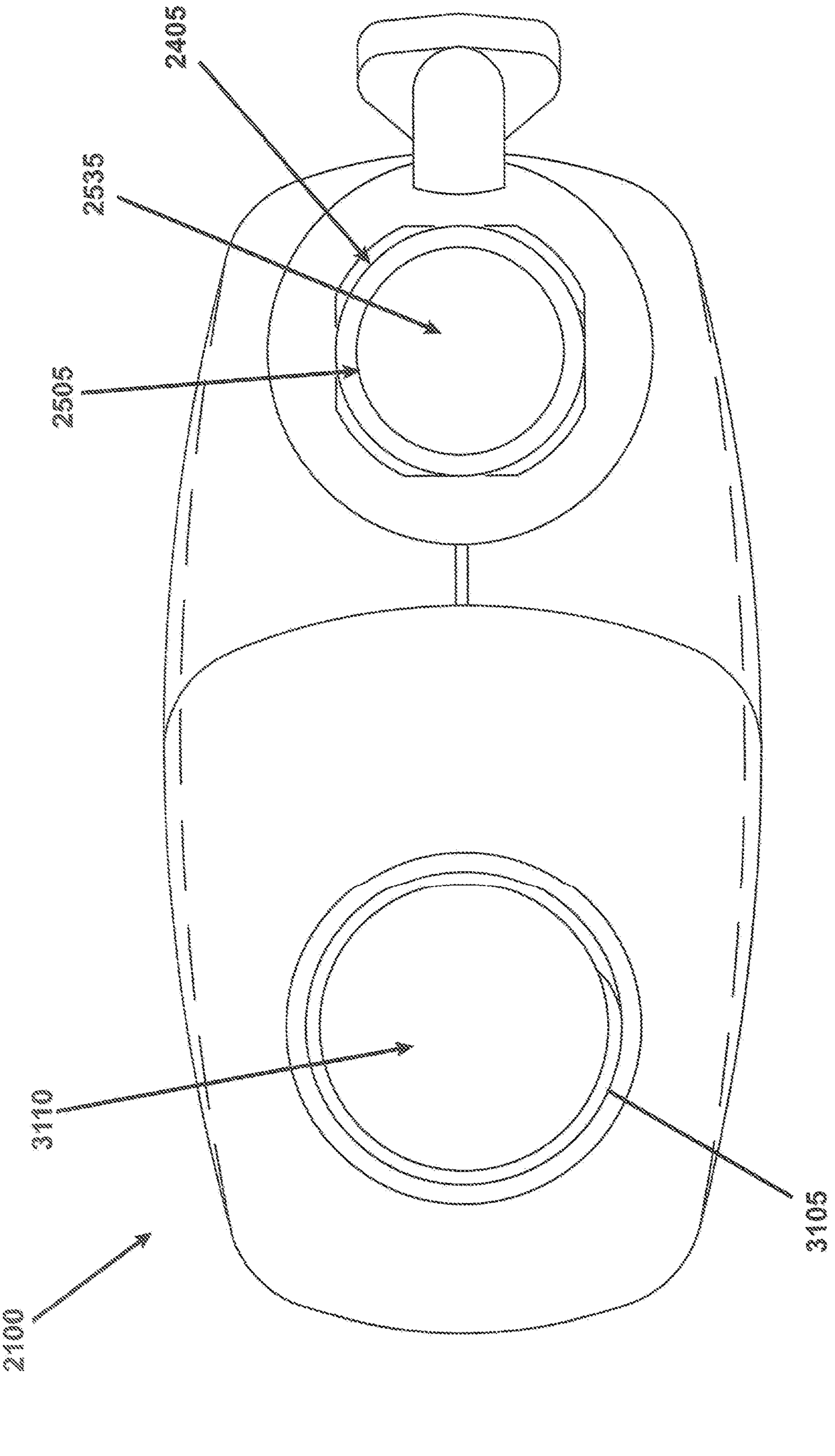
FIG. 7 illustrates a top view of a bottle embodiment.
Figure 8:
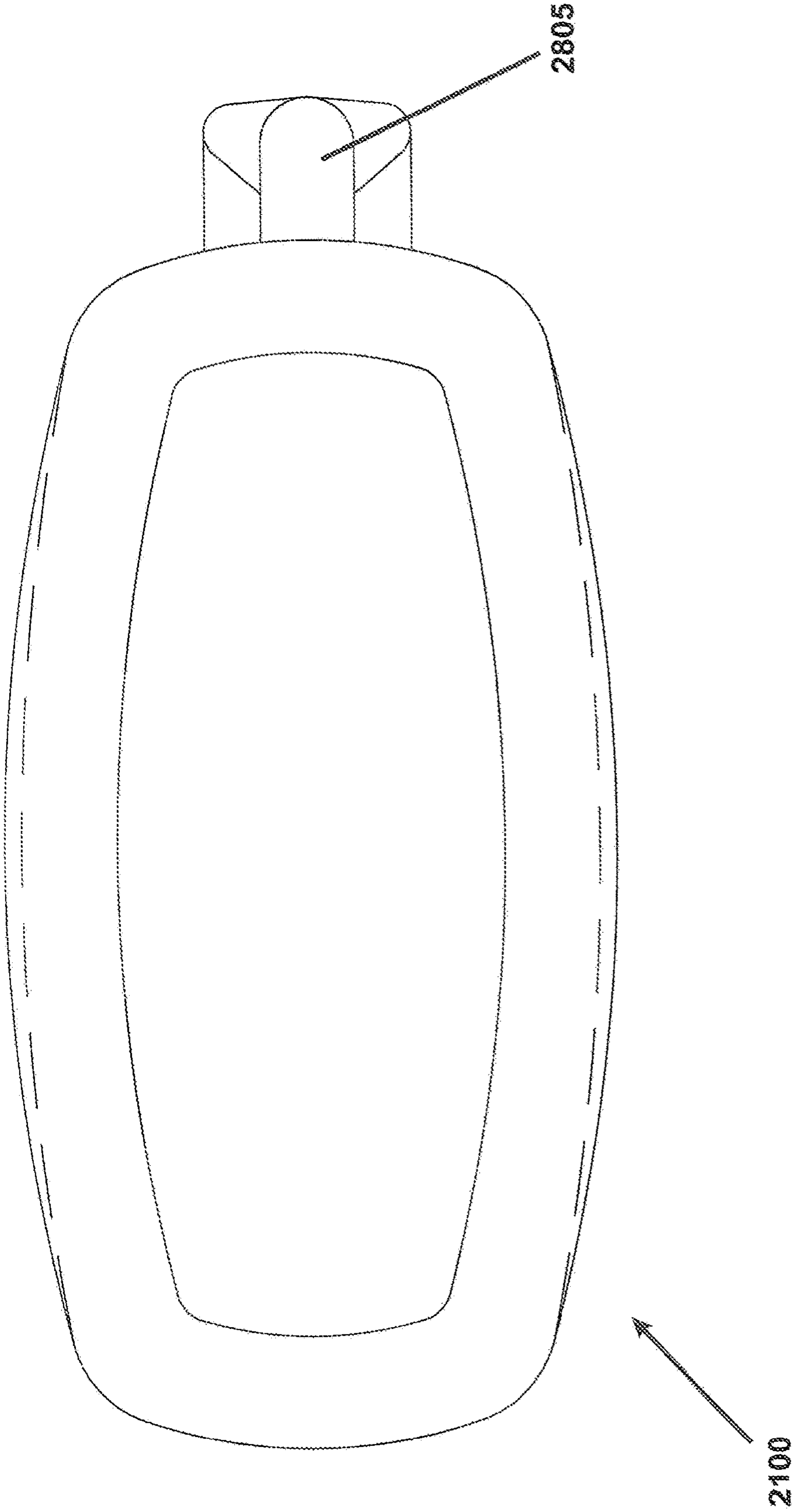
FIG. 8 illustrates a bottom view of a bottle embodiment.
Figure 9:
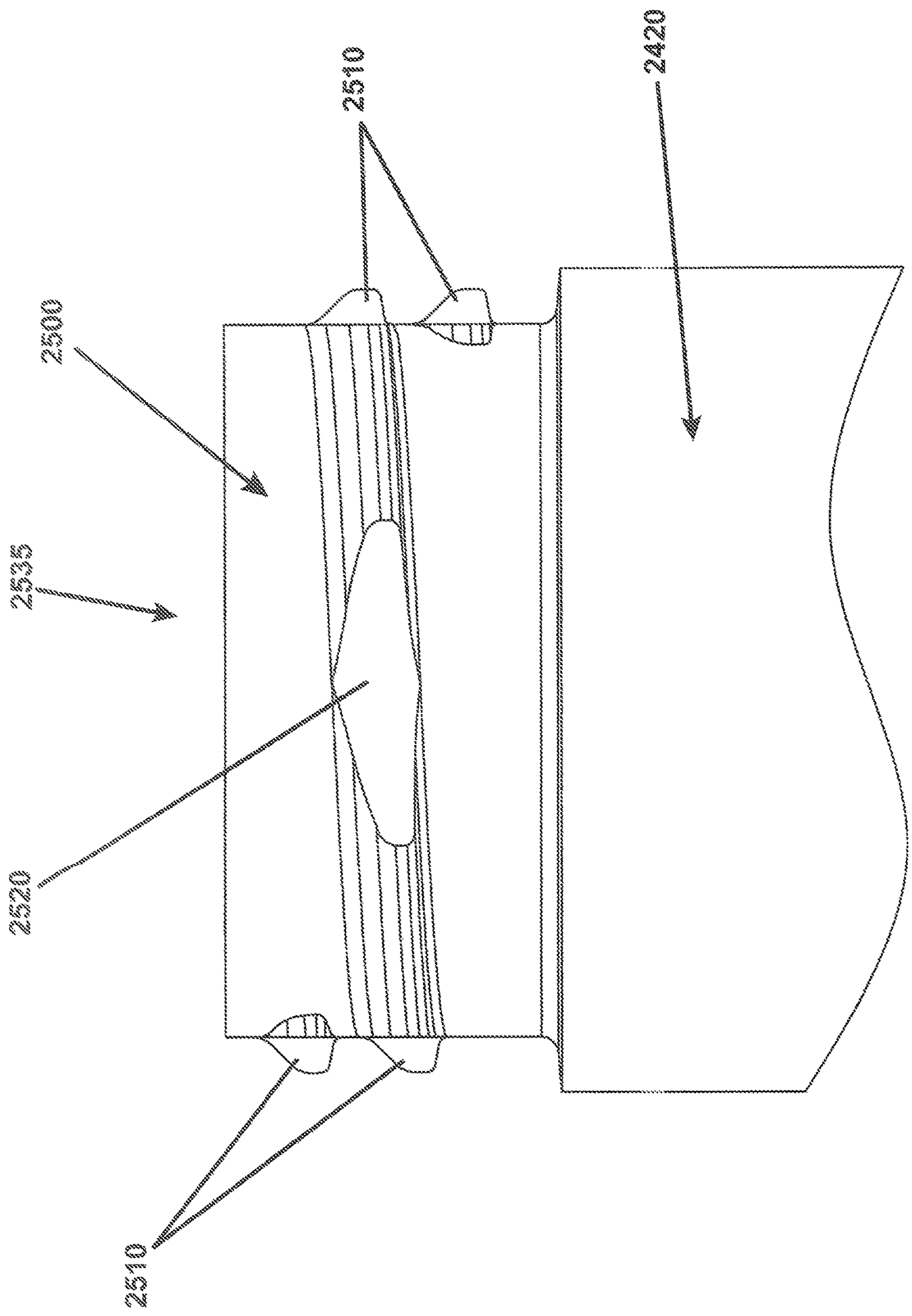
FIG. 9 illustrates a front view of a first-neck and first-lip portion of a bottle embodiment.
Figure 10:
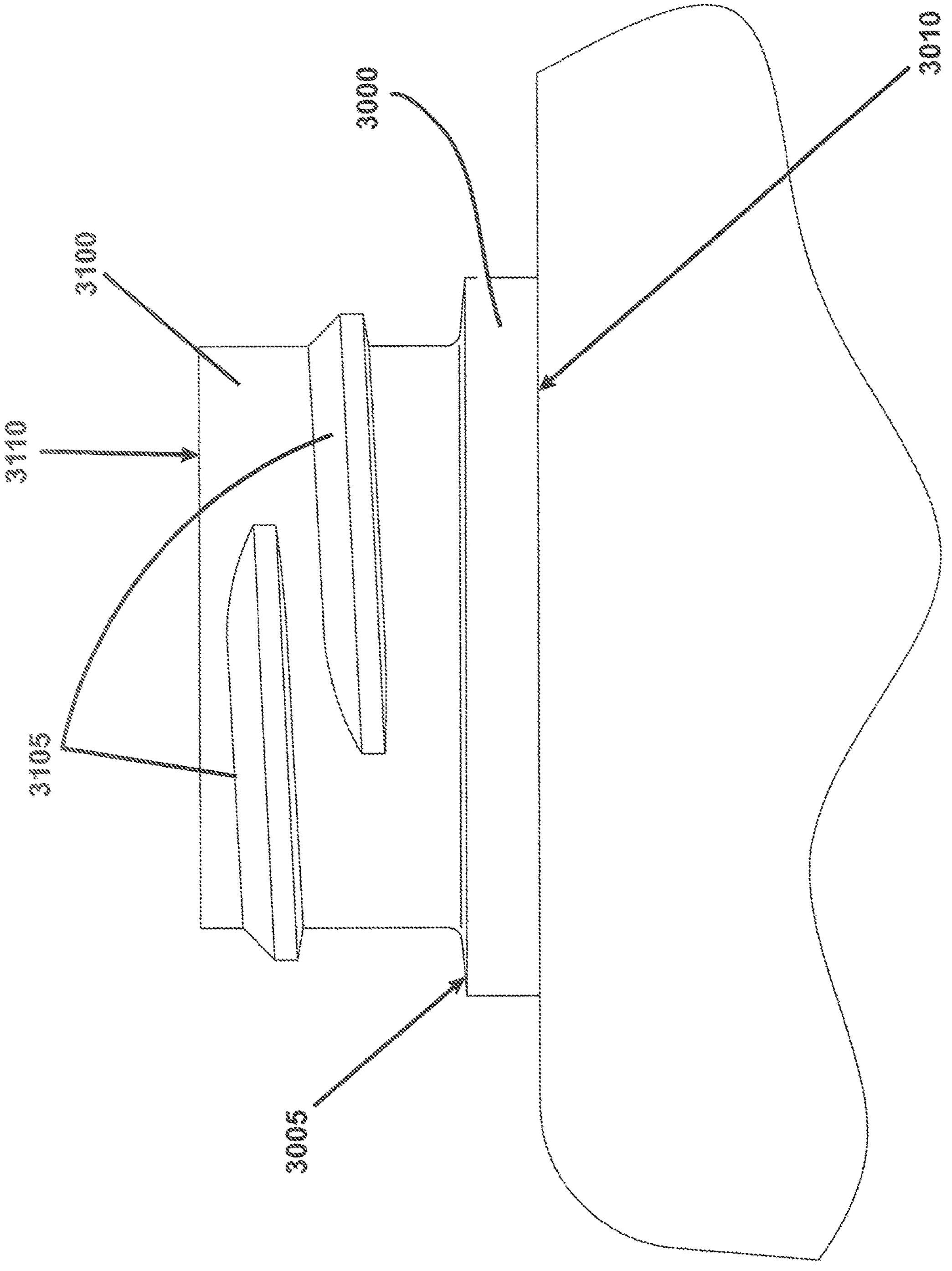
FIG. 10 illustrates a side view of a second-neck and second-lip portion of a bottle embodiment.
Figure 11:
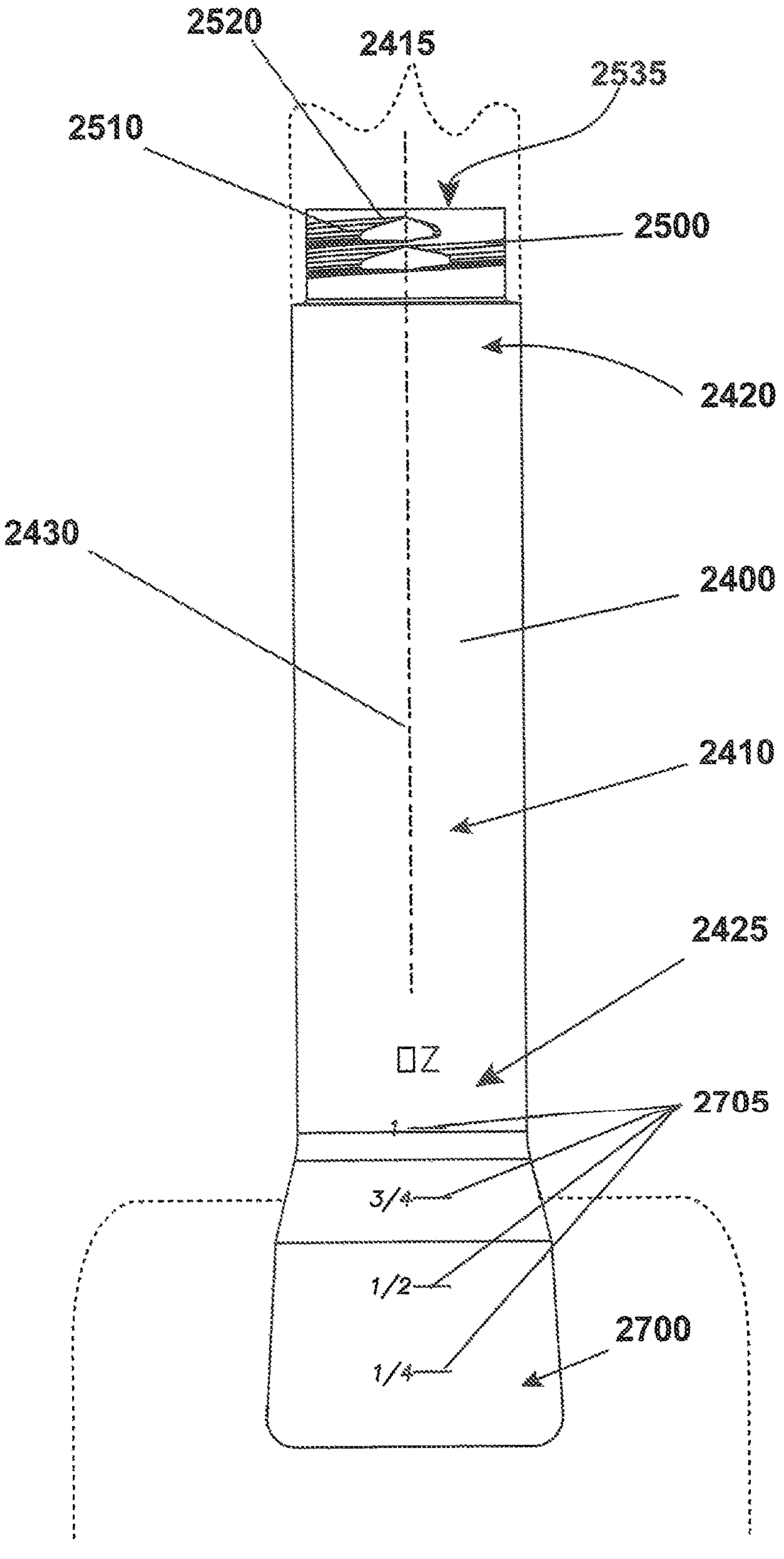
FIG. 11 illustrates a front view of a first-neck and second fluid-holding-and-measuring-chamber portion of a bottle embodiment.
Figure 12:
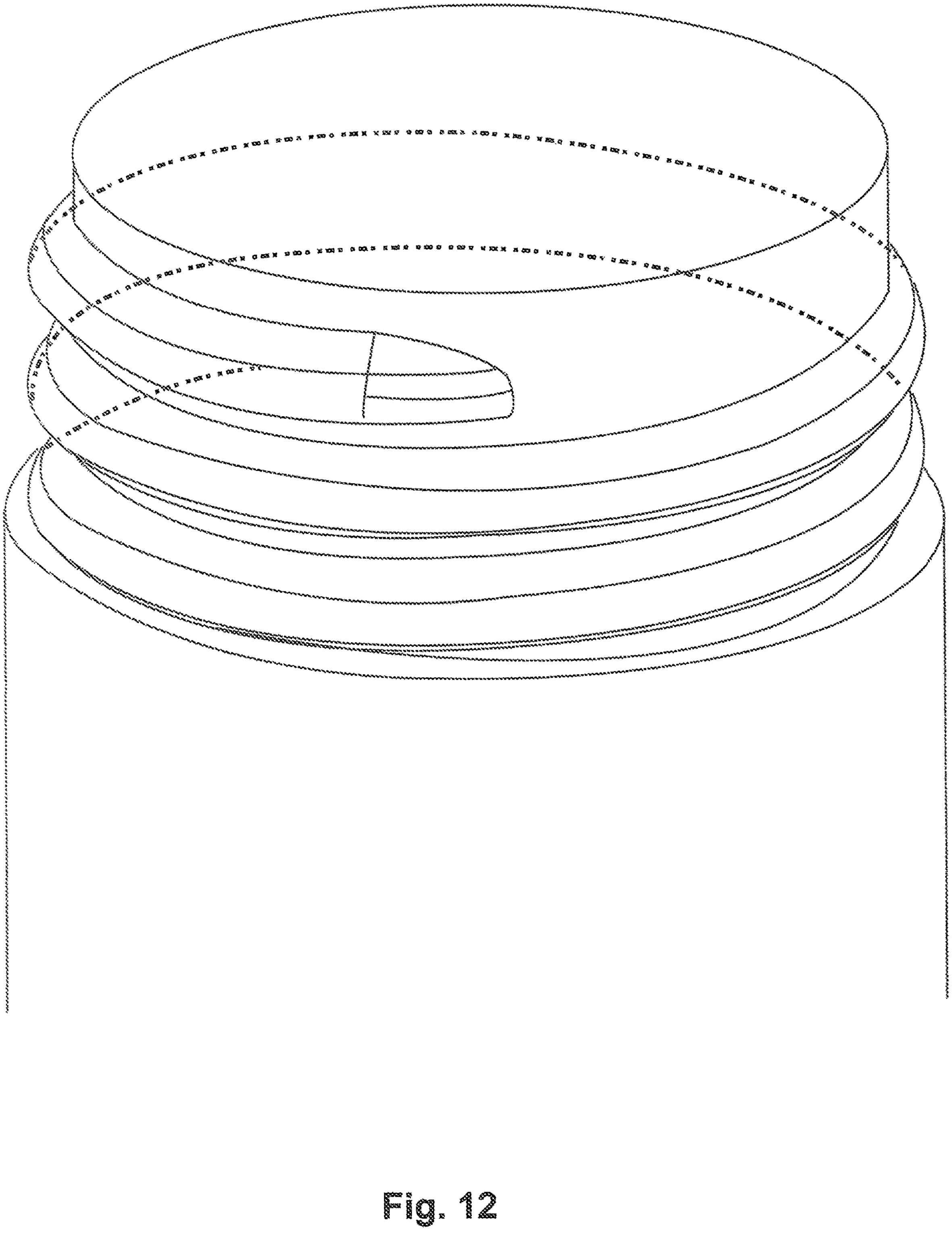
Fig. 12 PRIOR ART
FIG. 12 illustrates a perspective view of a known threaded-lip configuration.
Figure 13:
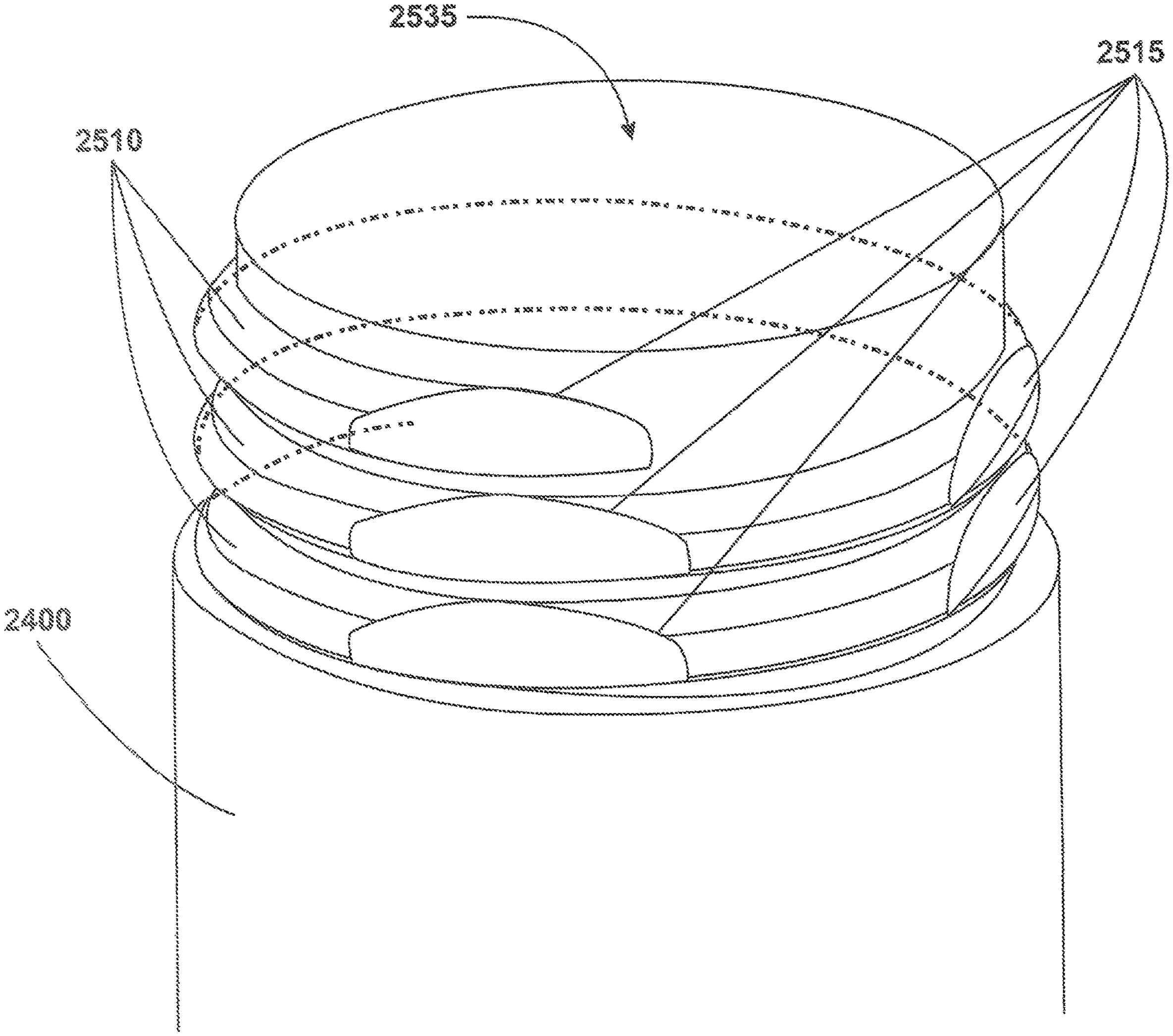
FIG. 13 illustrates a perspective view of a first-neck and first-lip portion of a bottle embodiment.

Embodiments are directed to a fuel-additive dispensing bottle used to dispense a liquid fuel additive into a capless fuel system having a self-sealing mechanism triggered by tabs. A first embodiment will be described with reference to FIGS. 1-14, and a second embodiment will be described with reference to FIGS. 1 and 15-26. In additional embodiments, neck and threading configurations are interchangeable between the first and second fuel-additive dispensing bottle embodiments.

First Embodiment

A first embodiment, see FIGS. 1-14, is directed to fuel-additive dispensing bottle 2100 that is used to dispense a pre-measured amount of liquid fuel additive (not shown) into capless fuel-tank system 300 having fluid-receiving aperture 315 and self-sealing mechanism 320 that is triggered by tabs 310. Bottle 2100 has first neck 2400 having a circumference 2405, a first-neck exterior surface 2410, and diameter 2415. In embodiments, diameter 2415 ranges from approximately 0.860 inches to approximately 1.004 inches. In other embodiments, diameter 2415 ranges from approximately 0.750 inches to approximately 1.19 inches.

Figure 14:
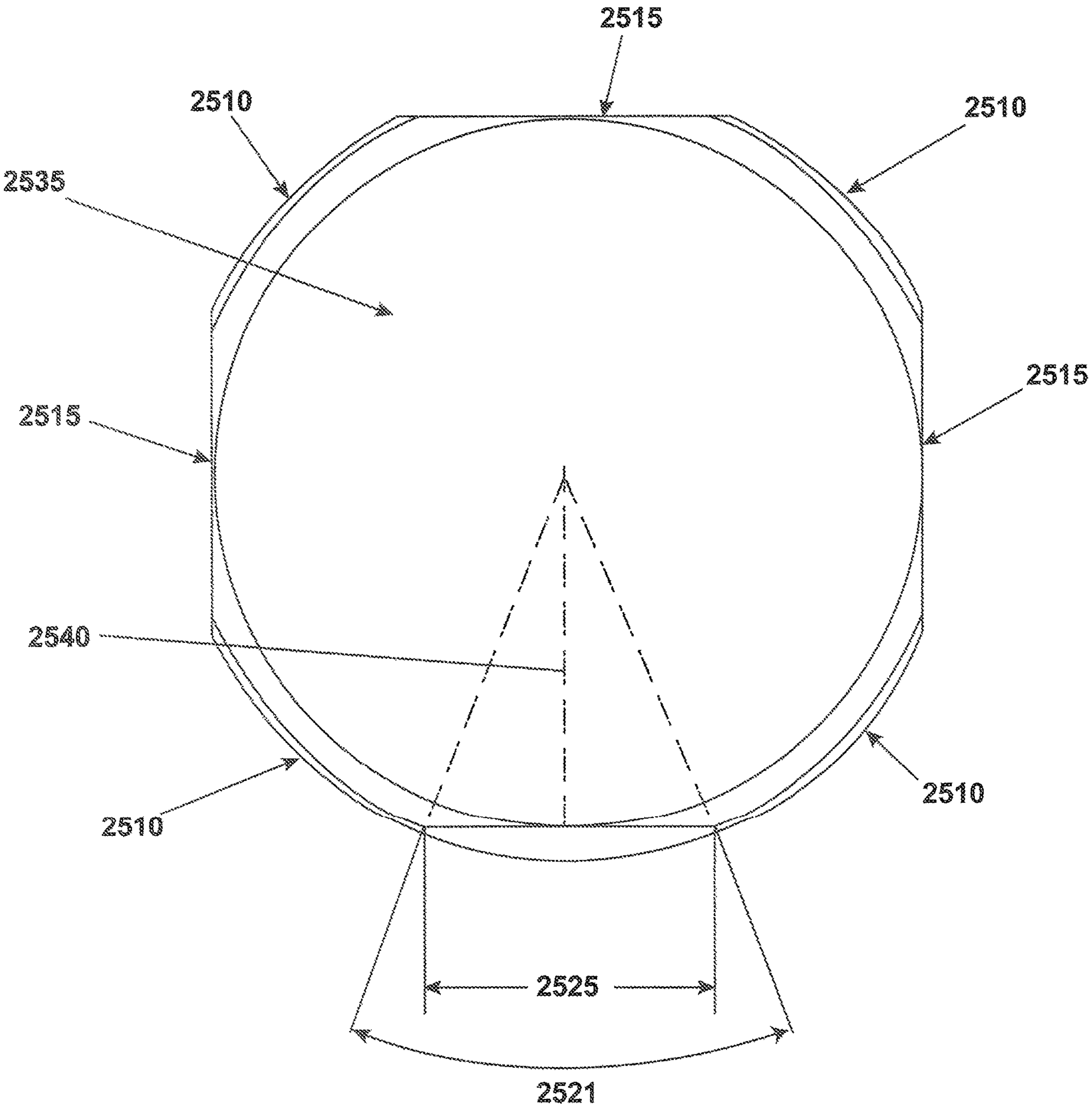
FIG. 14 illustrates a top view of a first-neck and first-lip portion of a bottle embodiment.
Figure 15:
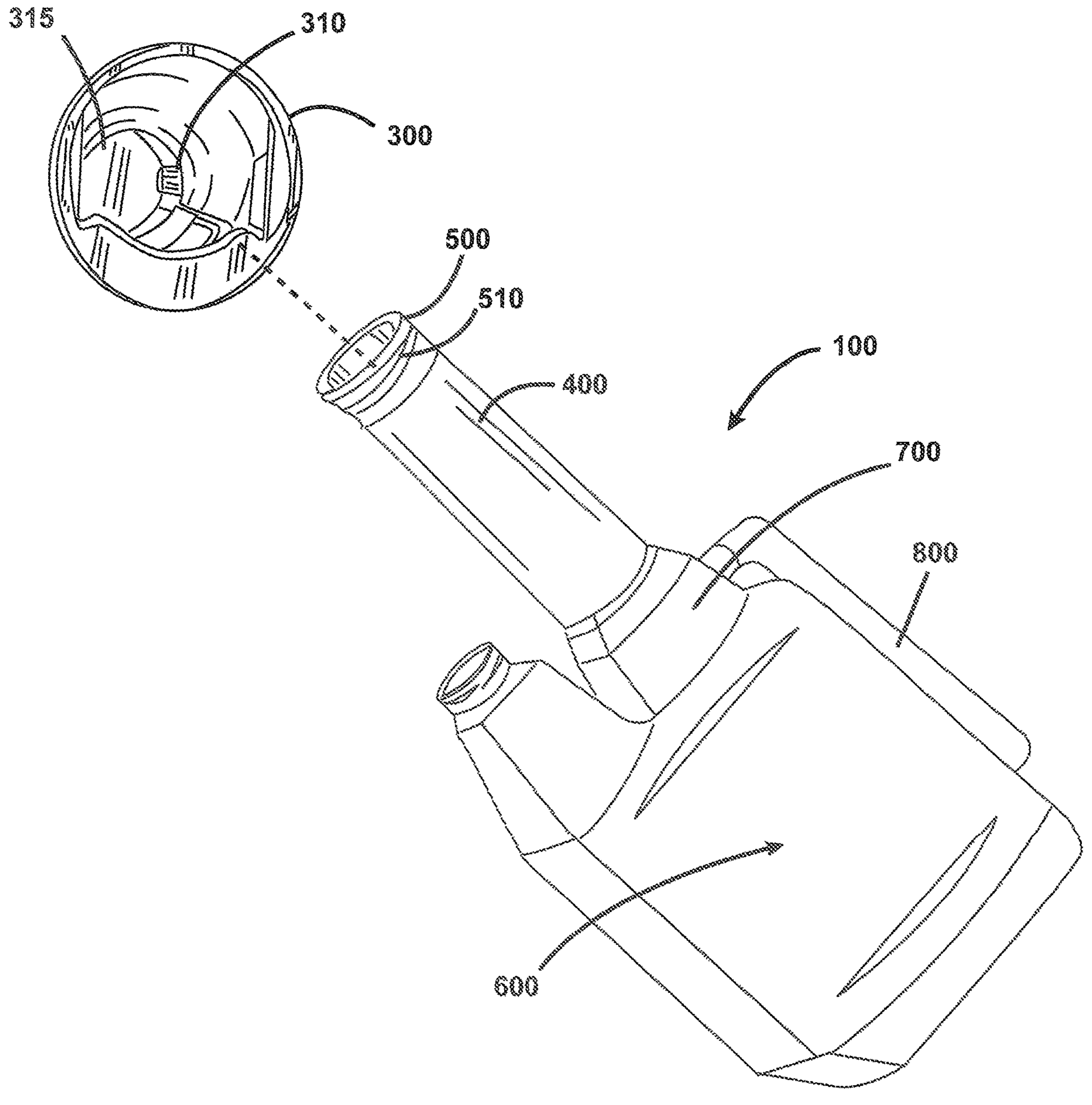
FIG. 15 illustrates a perspective view of a bottle embodiment in use with a capless fuel system.
Figure 16:
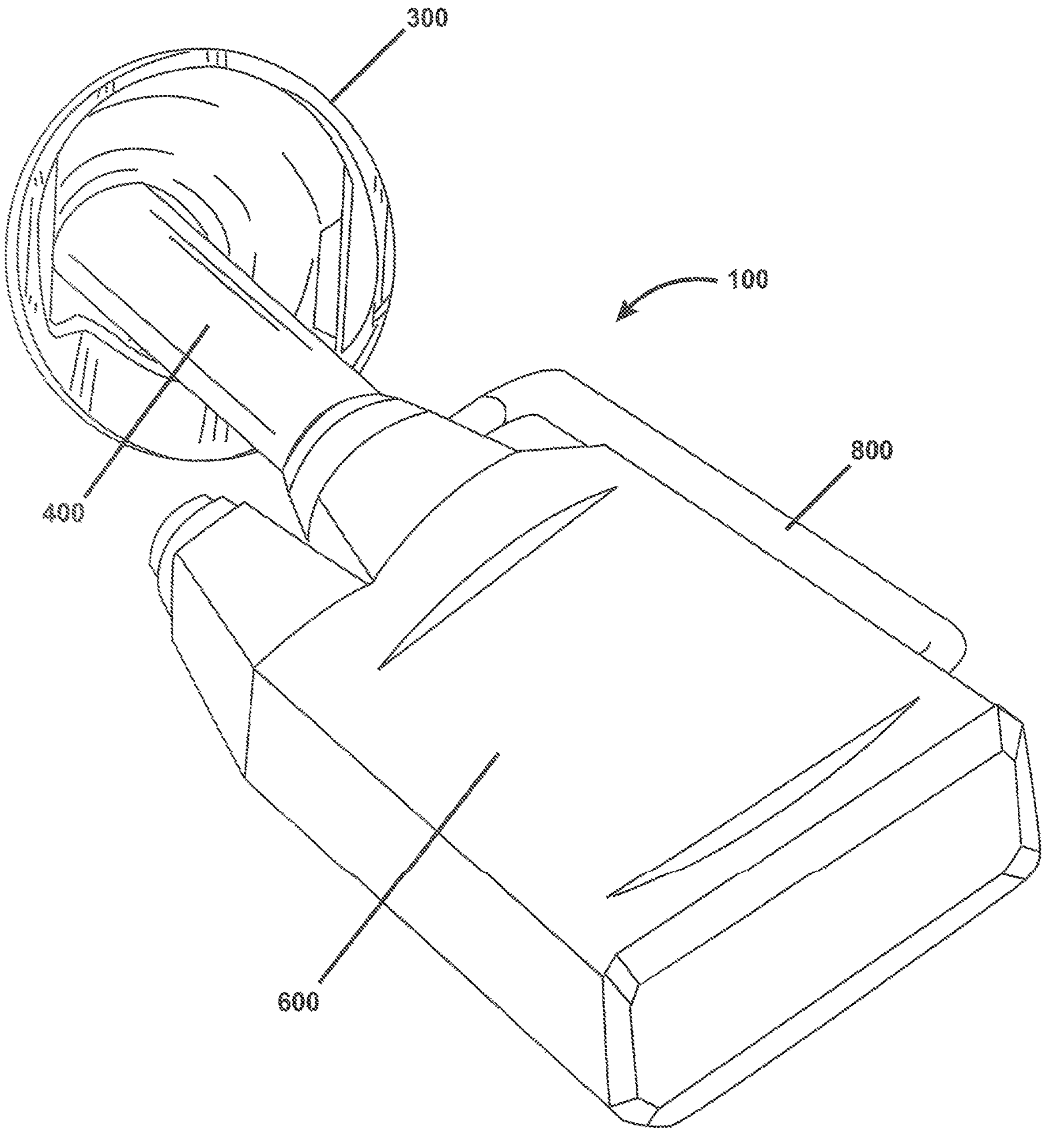
FIG. 16 illustrates a perspective view of a bottle embodiment in use with a capless fuel system.
Figure 17:
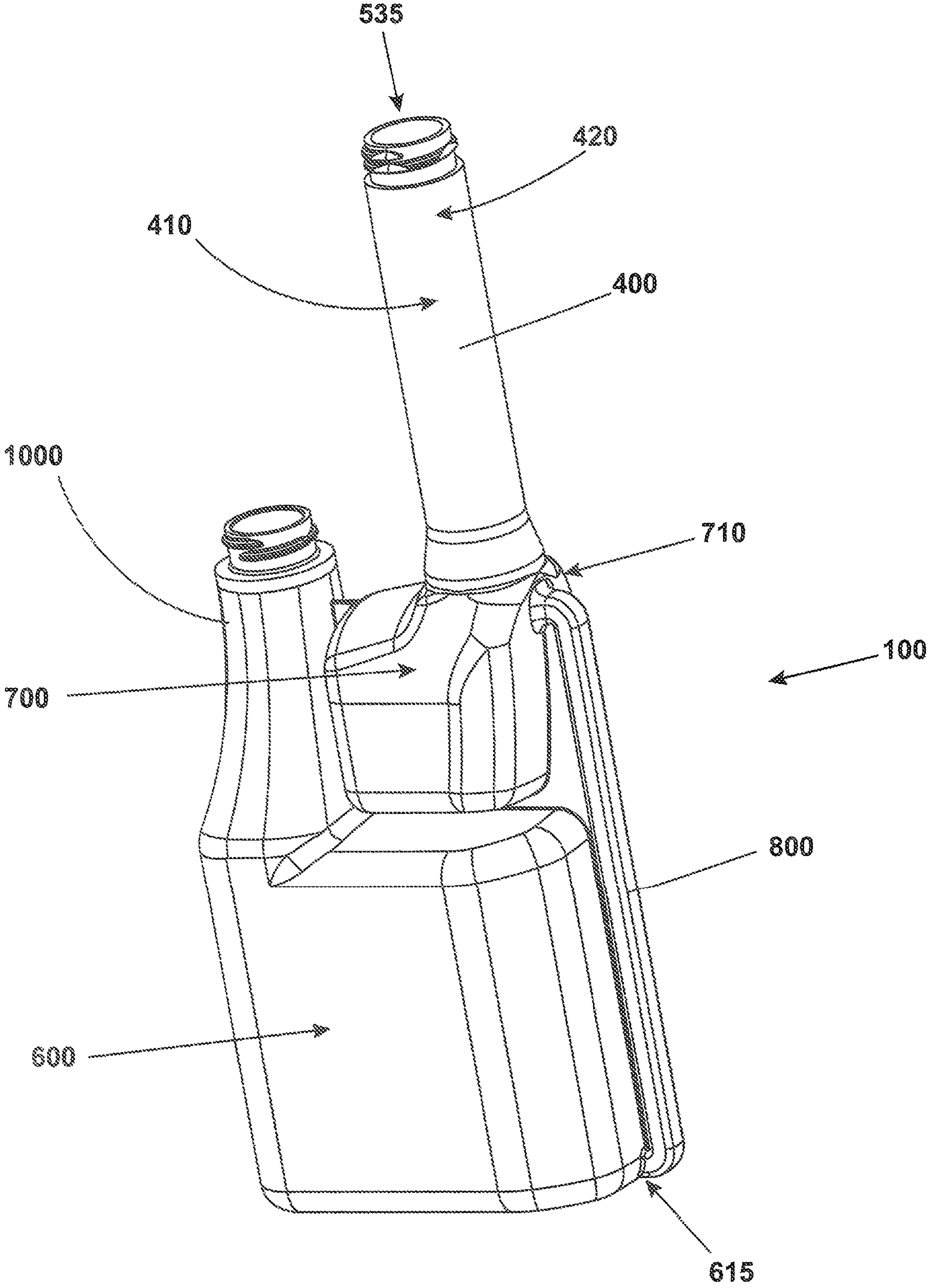
FIG. 17 illustrates a side perspective view of a bottle embodiment.
Figure 18:
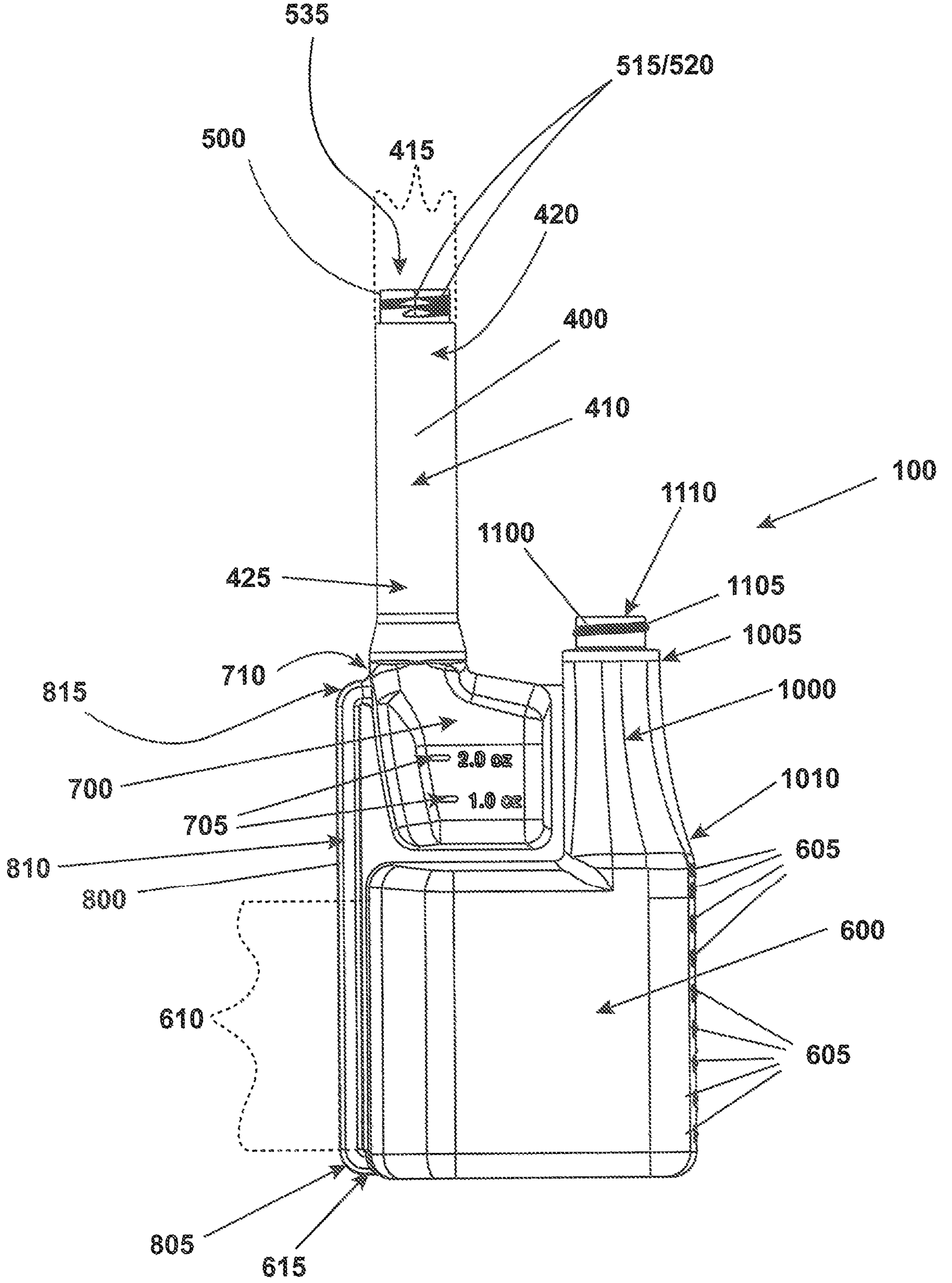
FIG. 18 illustrates a side view of a bottle embodiment.
Figure 19:
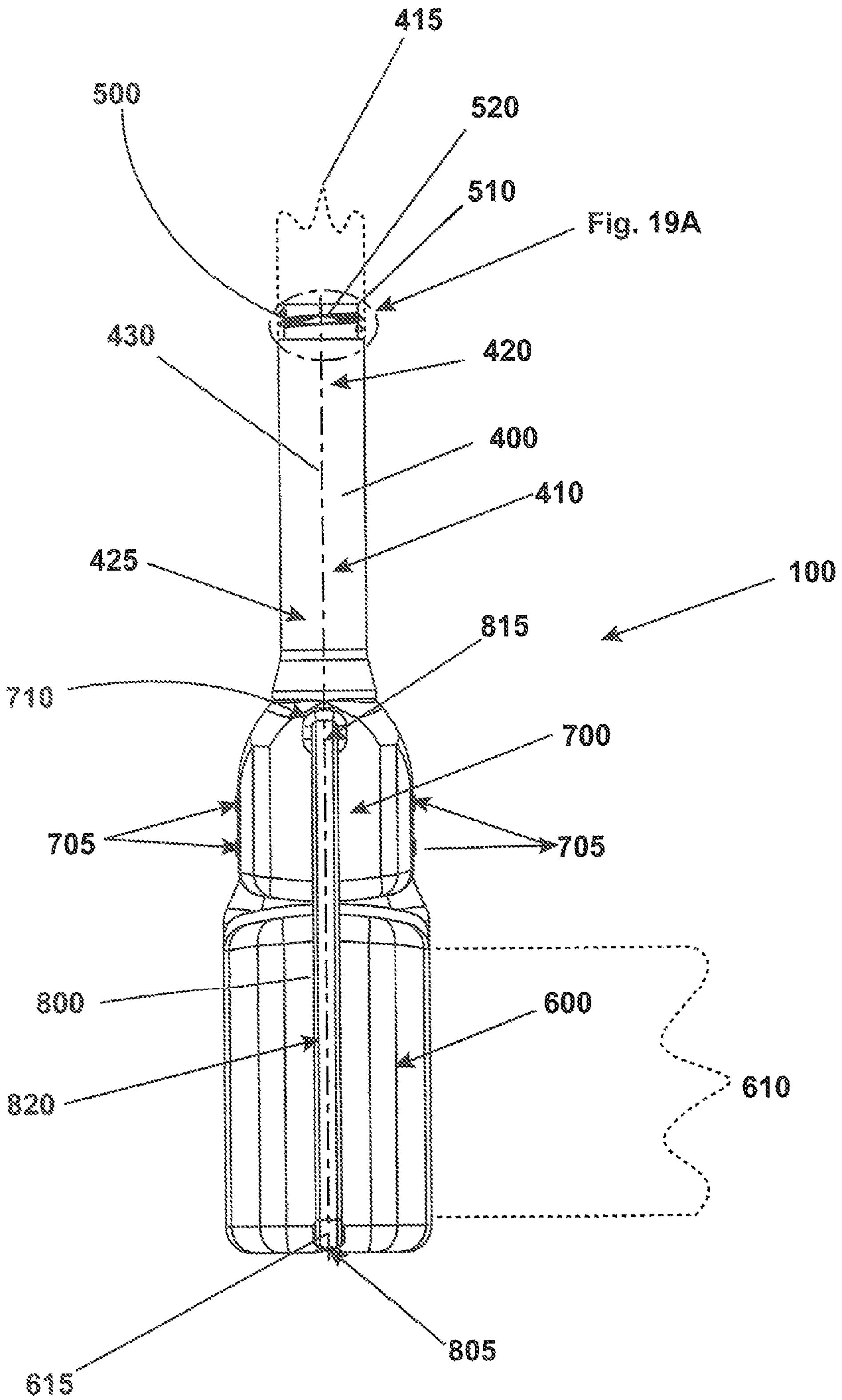
FIG. 19 illustrates a front view of a bottle embodiment.
Figure 19A:
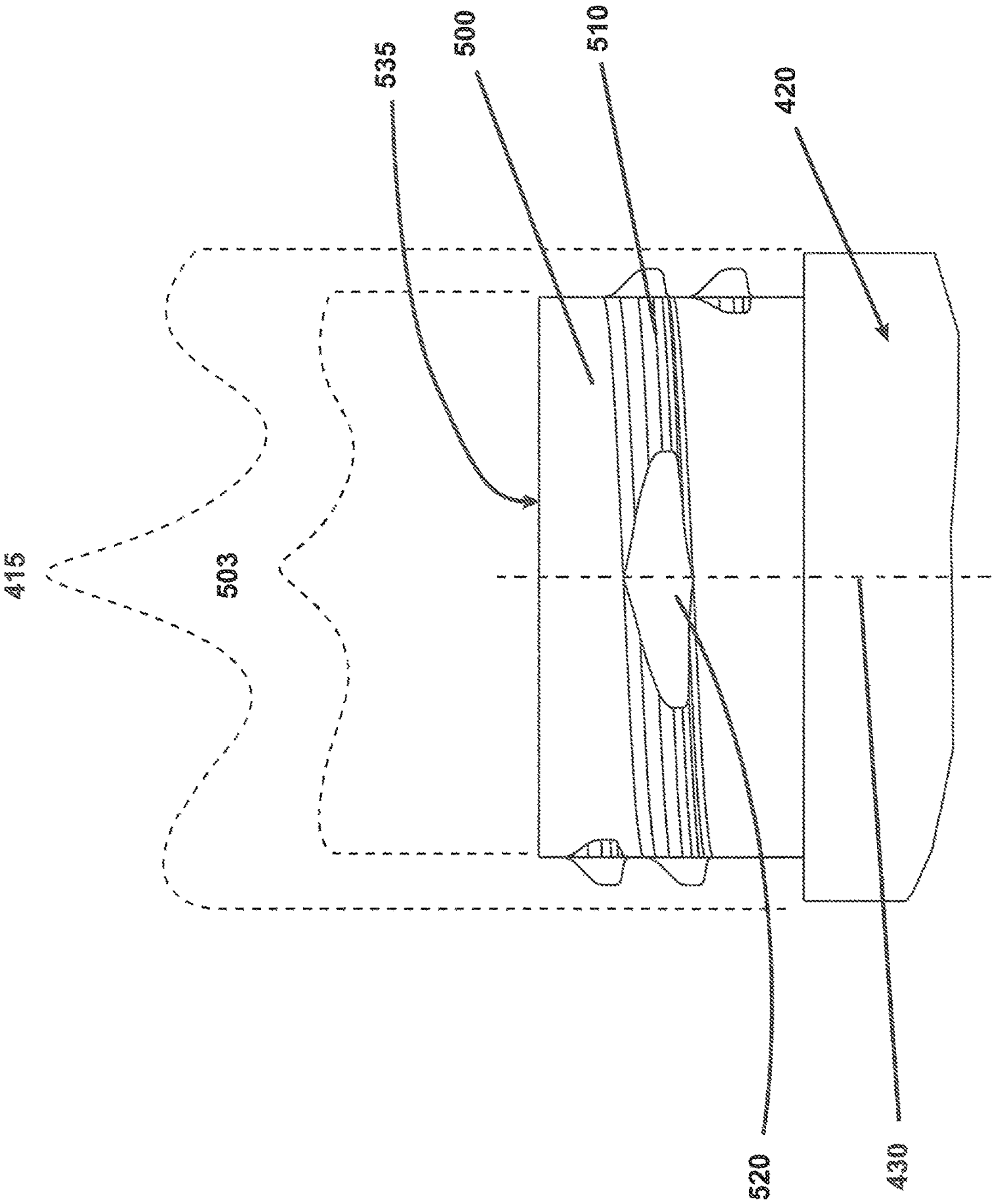
FIG. 19A a front view of a first-neck and first-lip portion of a bottle embodiment.
Figure 20:
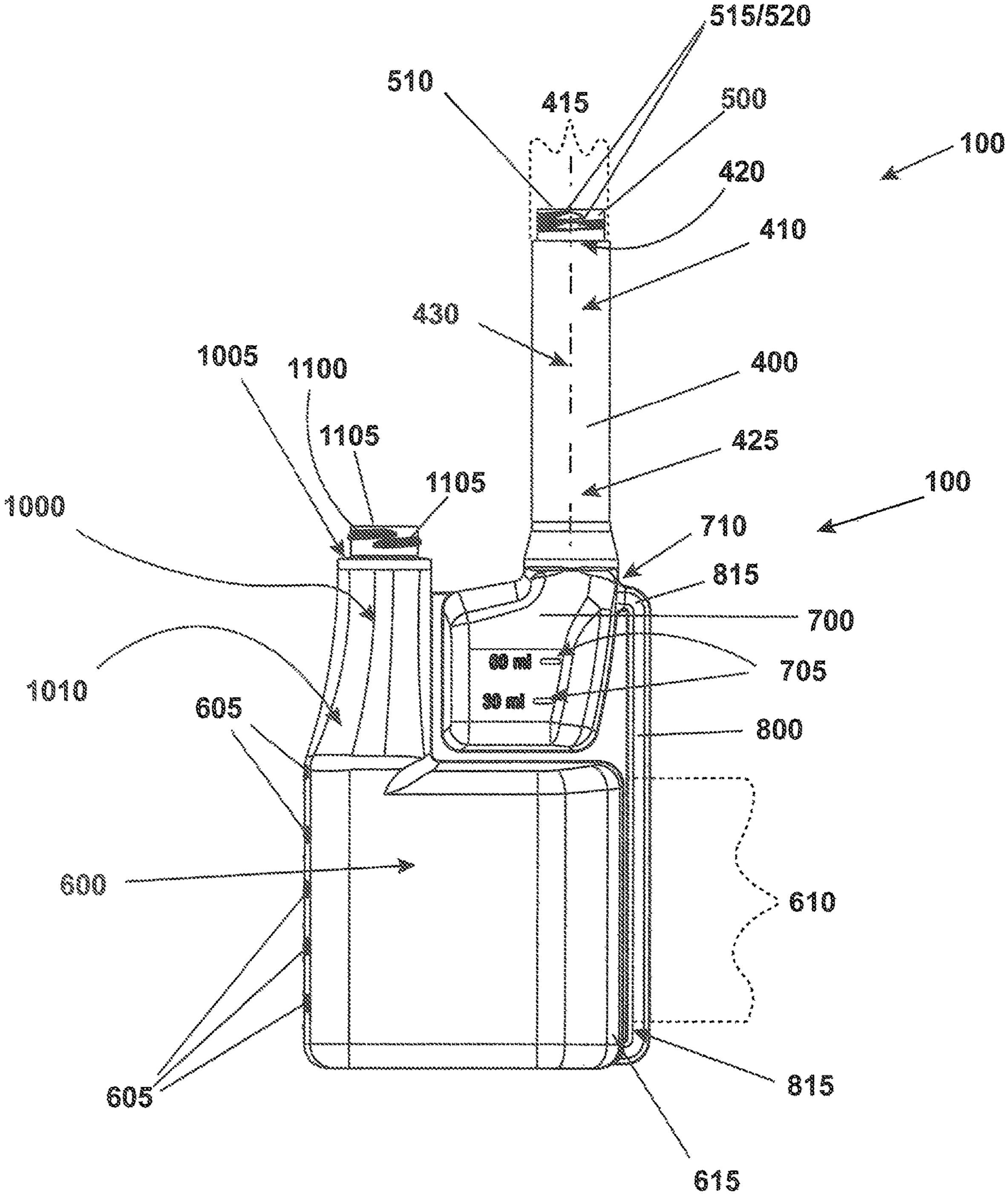
FIG. 20 illustrates a side view of a bottle embodiment.
Figure 21:
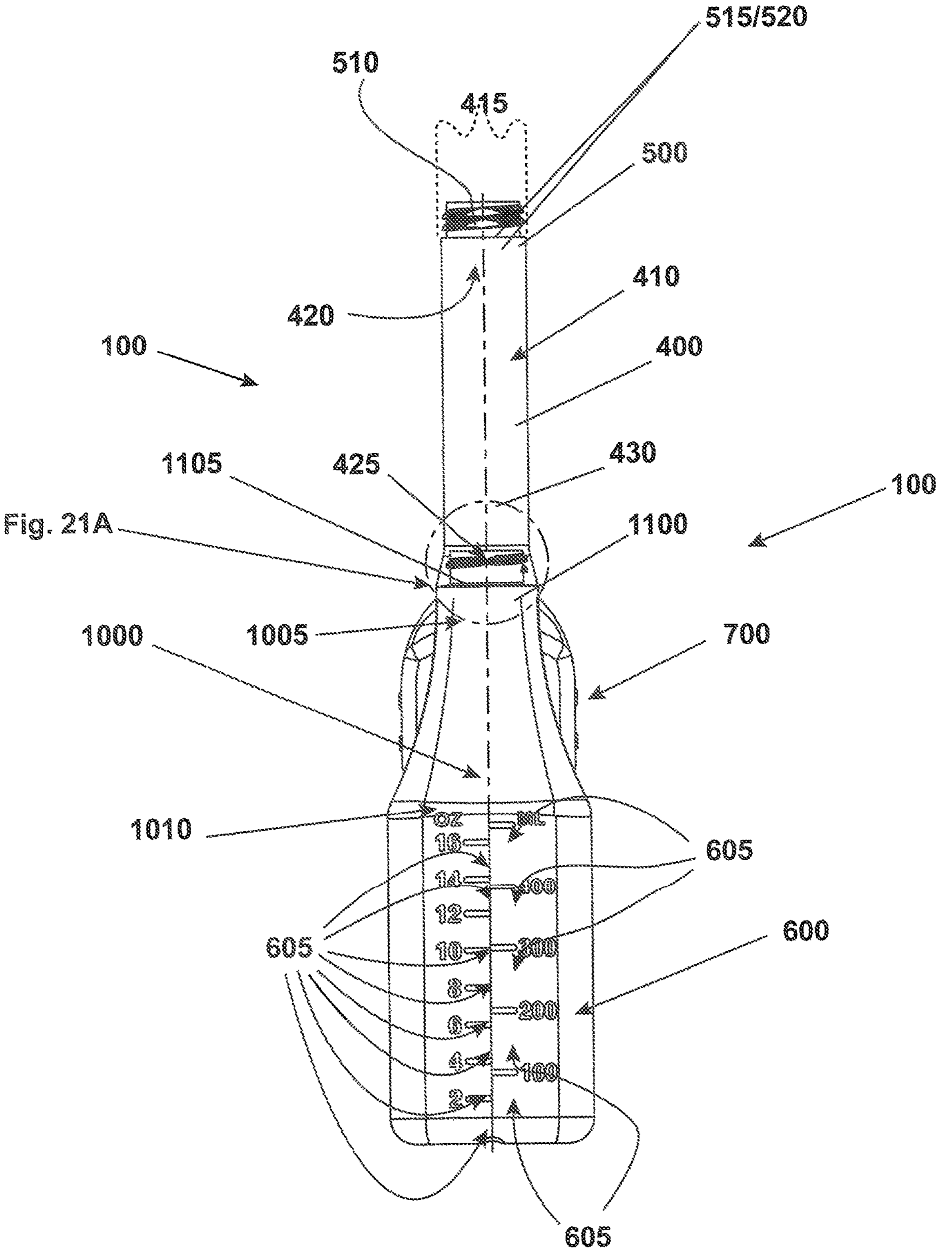
FIG. 21 illustrates a rear view of a bottle embodiment.
Figure 21A:
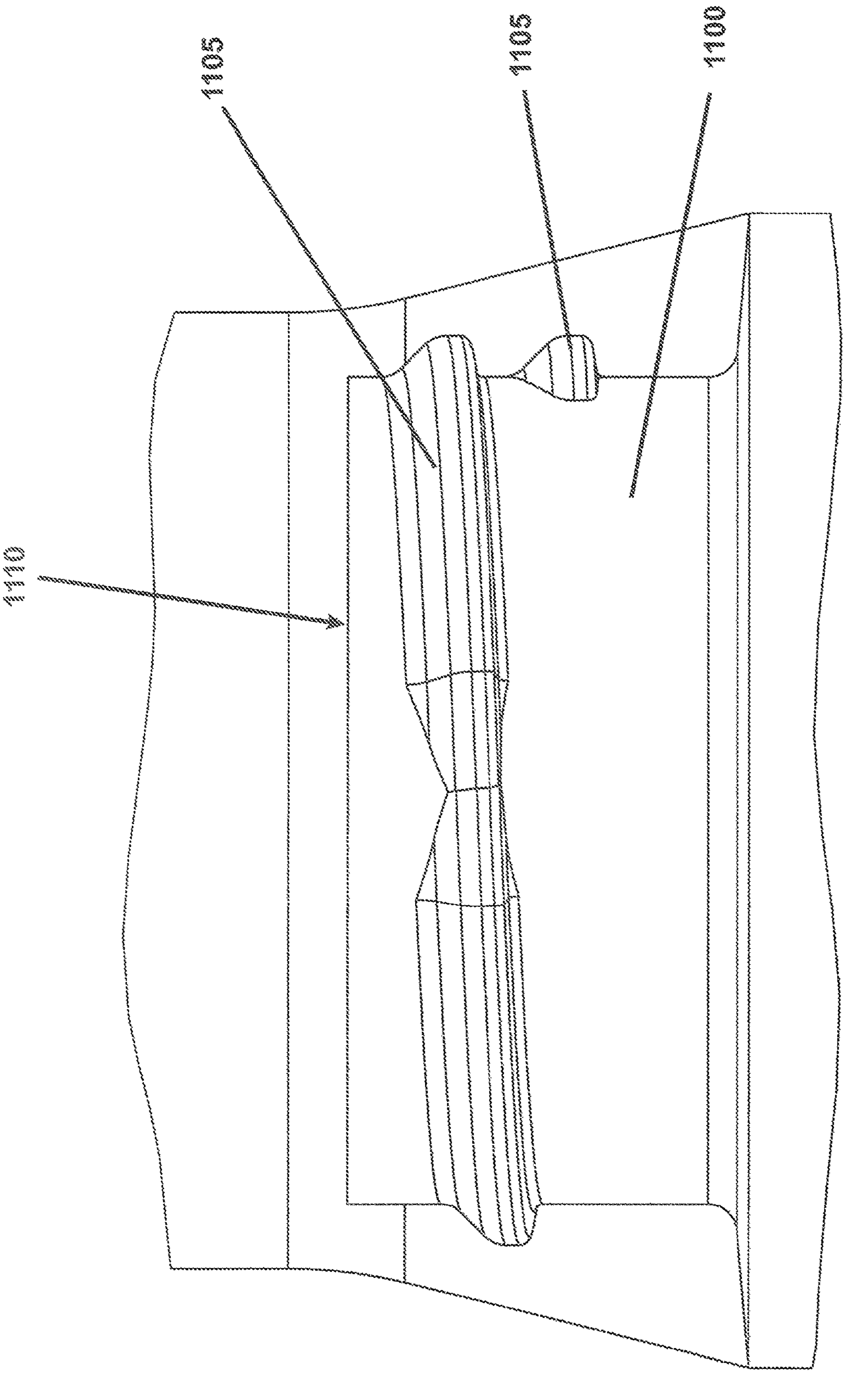
FIG. 21A illustrates a rear view of a second-neck and second-lip portion of a bottle embodiment.
Figure 22:
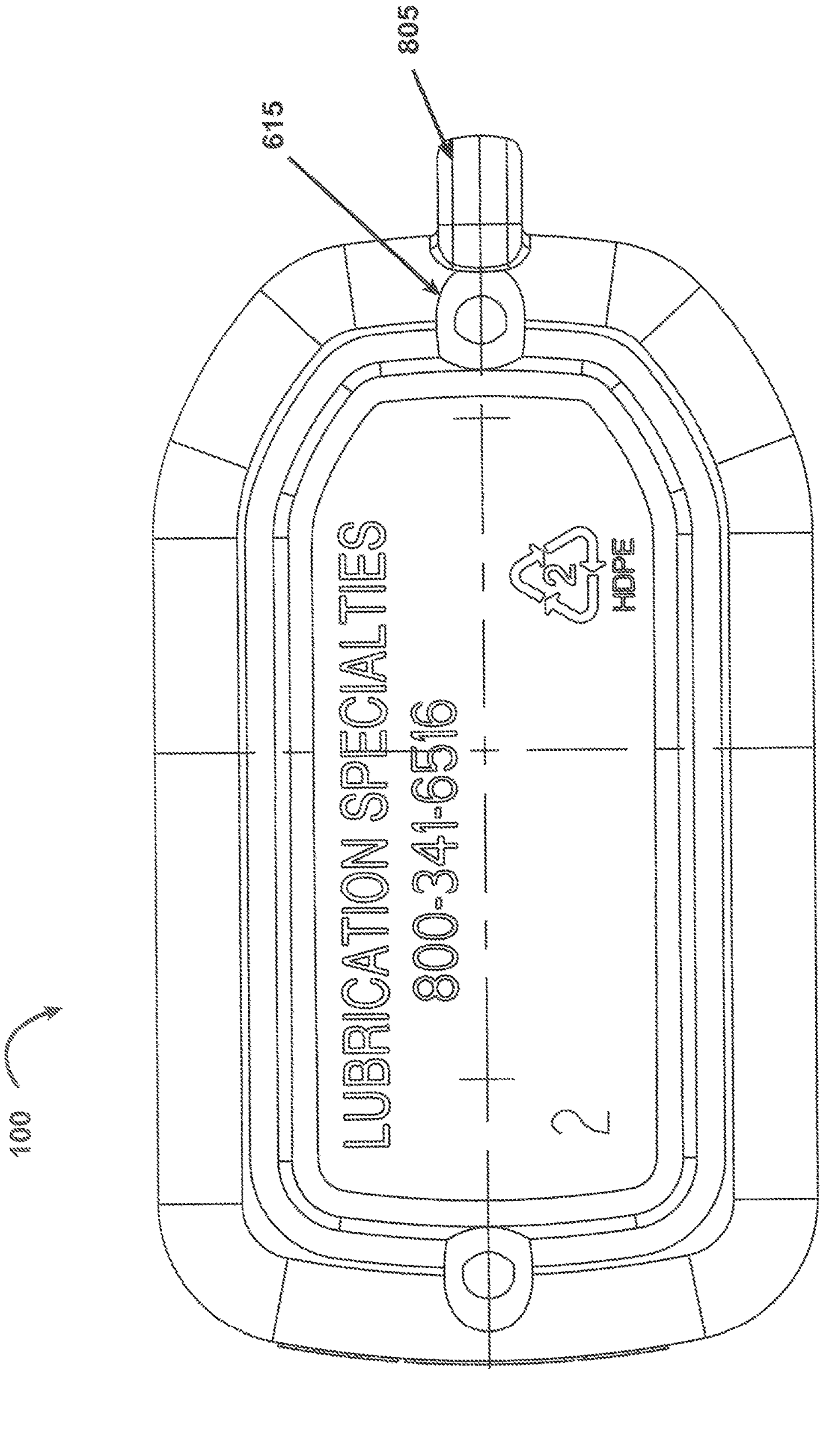
FIG. 22 illustrates a bottom view of a bottle embodiment.
Figure 23:
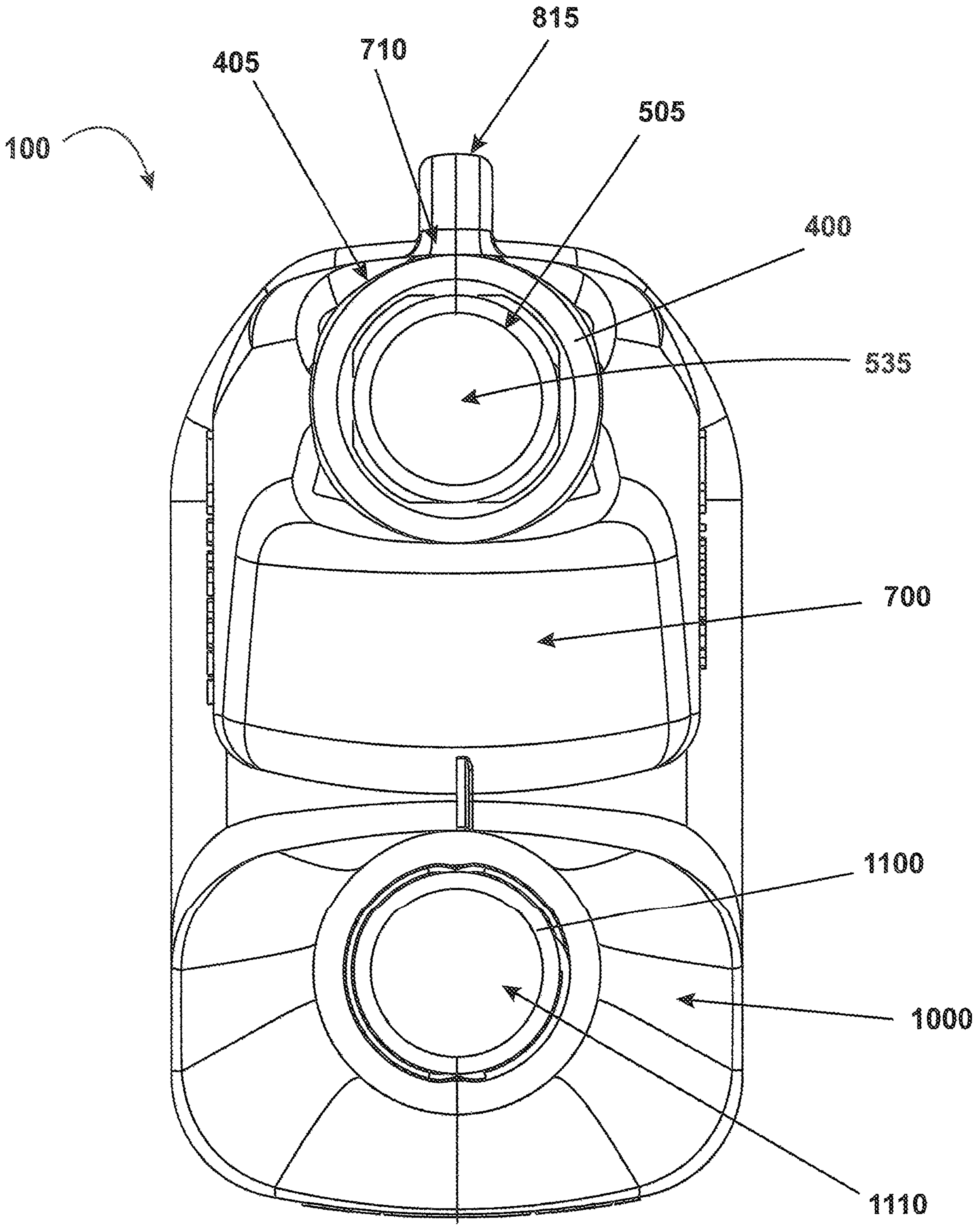
FIG. 23 illustrates a top view of a bottle embodiment.
Figure 24:
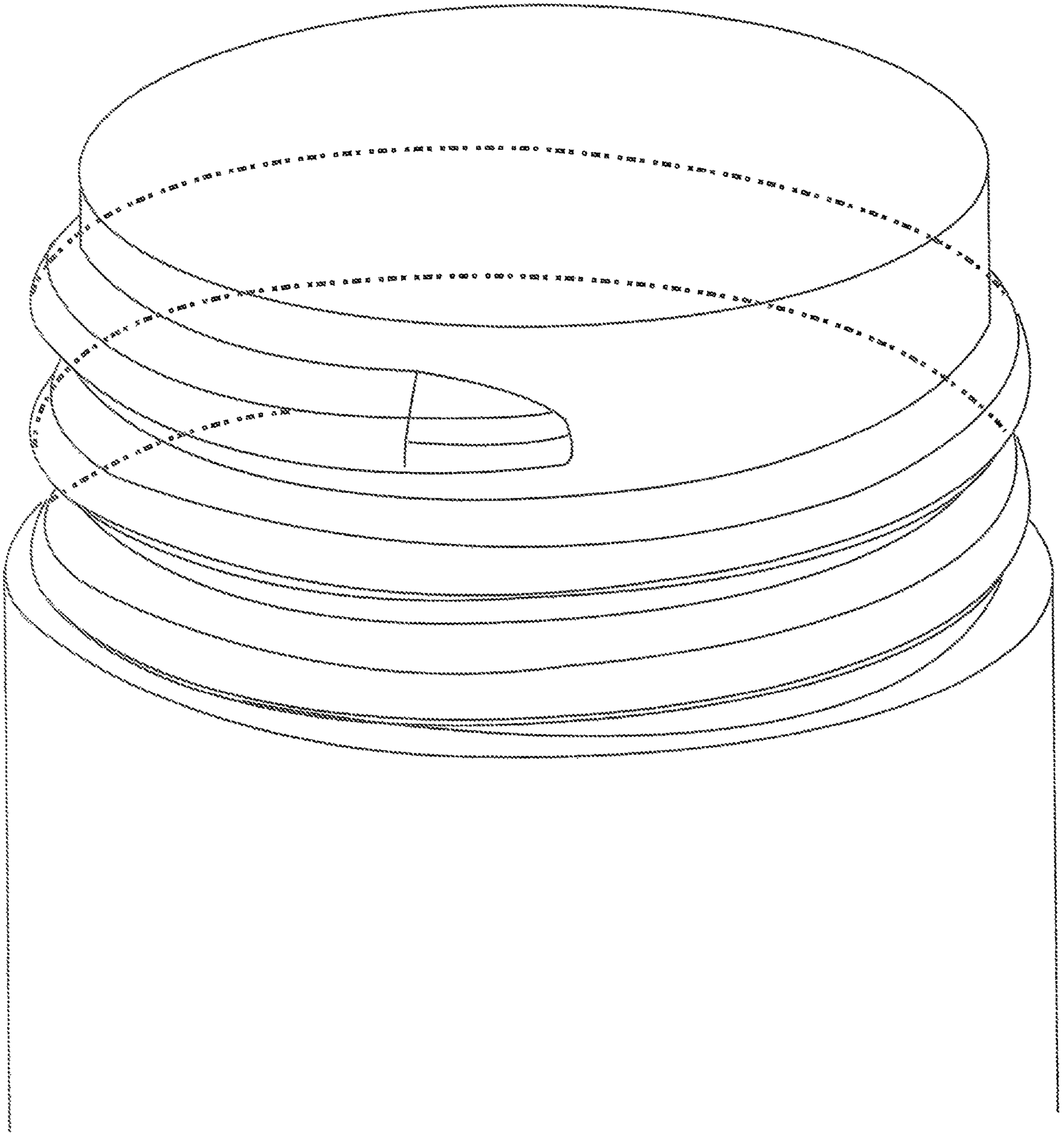
Fig. 24 PRIOR ART
FIG. 24 illustrates a perspective view of a known threaded-lip configuration.
Figure 25:
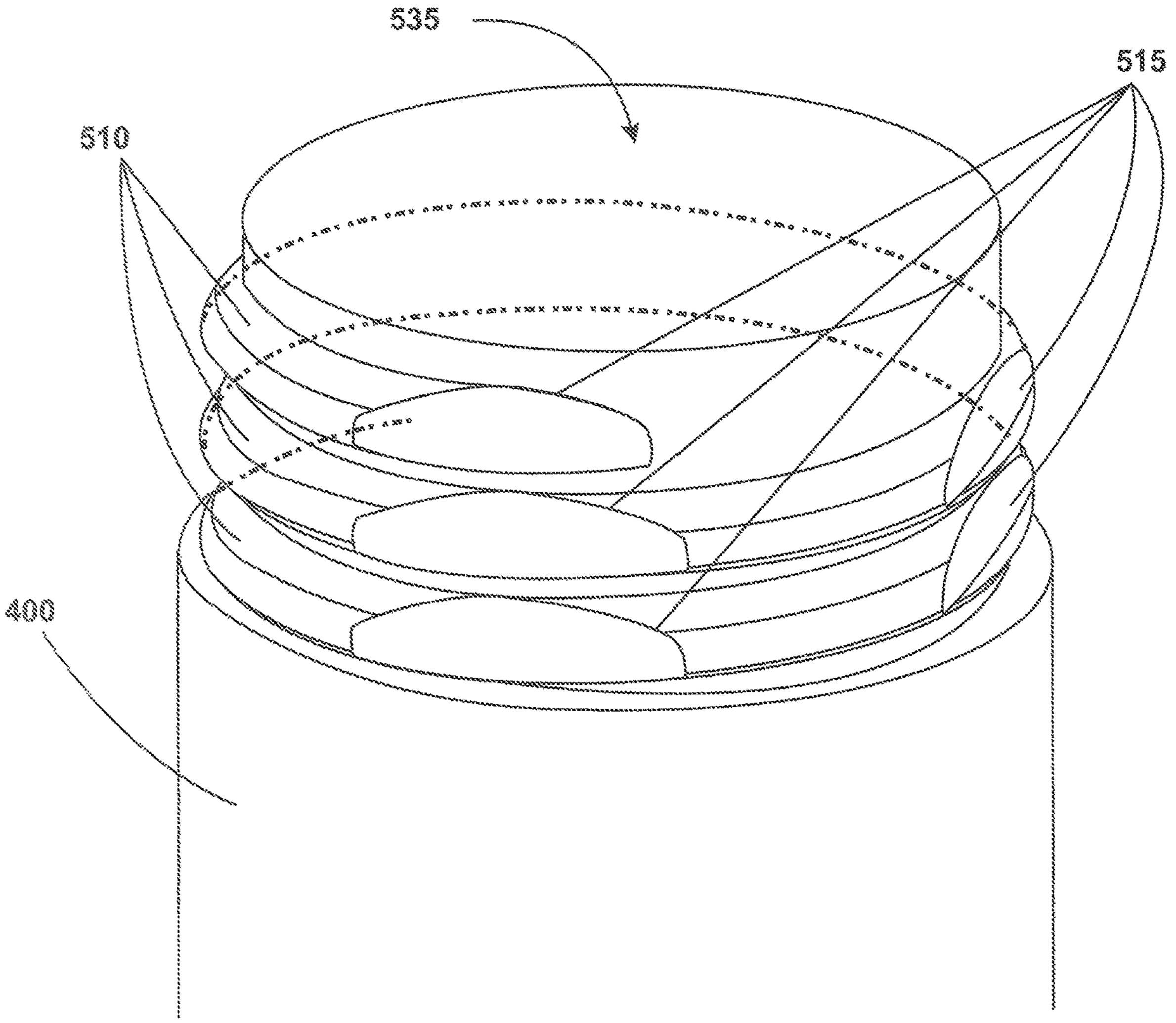
FIG. 25 illustrates a perspective view of first-neck and first-lip portion of a bottle embodiment.
Figure 26:
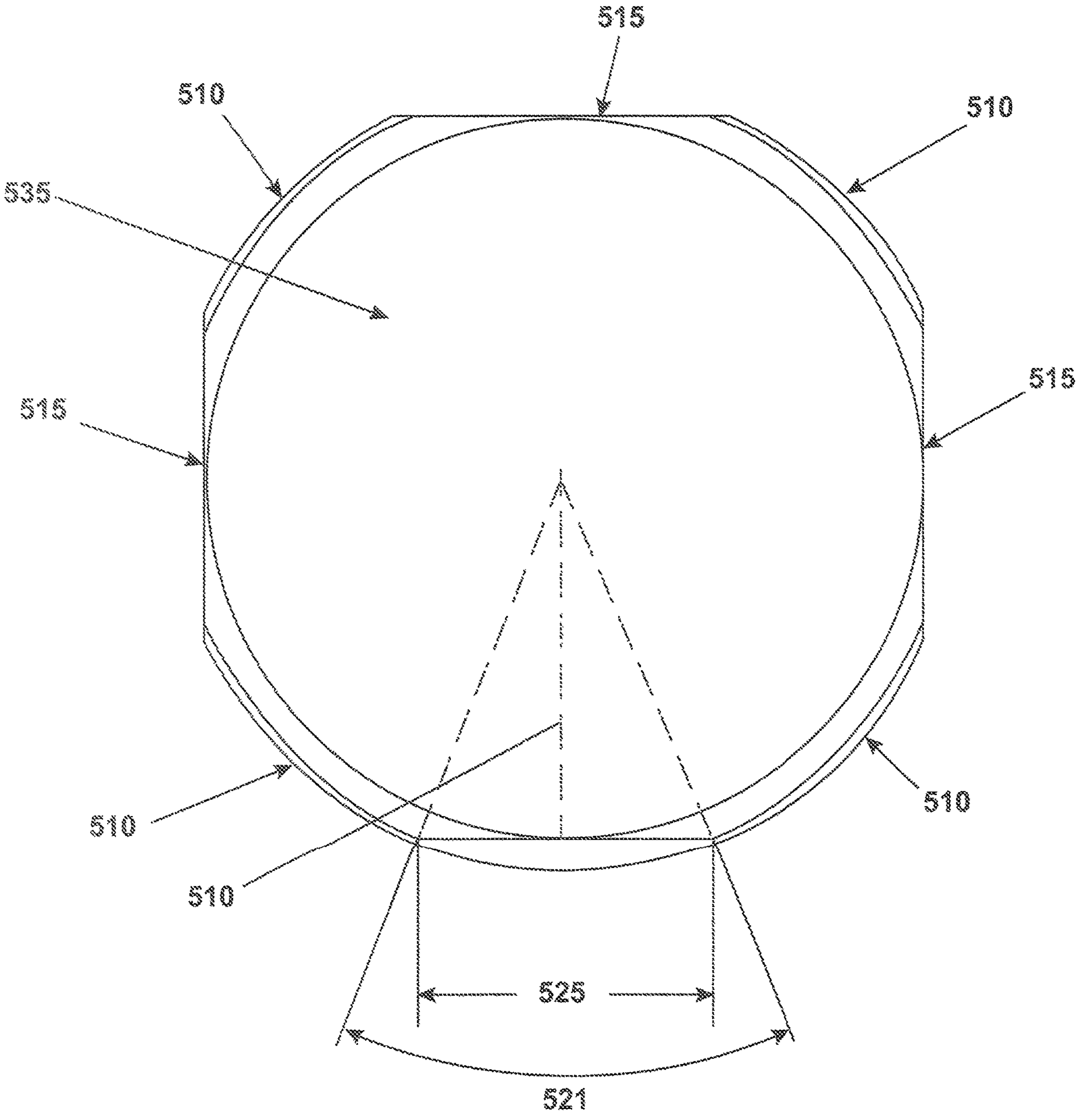
FIG. 26 illustrates a top view of a first-neck and first-lip portion of a bottle embodiment.

First lip 2500 has circumference 2505 and first lip 2500 is connected to first distal end 2420 of first neck 2400, exterior portions of first lip 2500 define screw-cap threading 2510. Sections of screw-cap threading 2510 are disrupted in a planar fashion so as to frame substantially planar thread disruptions 2515 that have planar surfaces 2520. In use, substantially planar thread disruptions 2515 allow first neck 2400 to be removed from capless fuel-tank system 300 without having screw-cap threading 2510 get caught on one or more tabs 310 during removal; planar surfaces 2520 prevent tabs 310 from catching on screw-cap threading 2510 and instead planar surfaces 2520 slide past tabs 310 during removal. In embodiments, each planar surface 2520 has a greatest width (i.e., the width being in a direction that is axial or normal to a lengthwise direction of threading 2510) that matches a width or diameter of a screw-cap thread 2510 being disrupted. In embodiments, each flattened planar surface 2520 has a longitudinal length 2525 (i.e., the longitudinal length being in a direction that is substantially parallel to a lengthwise direction of threading 2510) that extends along a length of screw-cap threading 2510. In embodiments, and as shown in FIG. 14, flattened planar surface 2520 has a longitudinal length 2525 that that ranges, in terms of degrees 2521 (see FIG. 14), from approximately 9° to 11° around first-lip circumference 2505; in embodiments degrees 2521 is approximately 10.2° around first-lip circumference 2505. In embodiments, each consecutive substantially planar thread disruption 2515 is respectively spaced around first lip 2500 and apart from a next-closest substantially planar thread disruption 2515 such that collectively, the substantially planar thread disruptions 2515 may be aligned with tabs 310 of capless fuel-tank system 300 (see FIG. 14). In embodiments, substantially planar thread disruptions 2515 are arranged at 90° intervals around first-lip circumference 2505. In embodiments, a plurality of substantially planar thread disruptions 2515 are spaced at regular intervals on threading 2510.

First neck 2400 and first lip 2500 are configured for insertion into capless fuel system 300 via fluid receiving aperture 315, and upon initiating insertion, at least two substantially planar thread disruptions 2515 align with tabs 310 such that tabs 310 are depressed without impeding entry of first lip 2500 into fluid-receiving aperture 315.

In embodiments, substantially circular first lip 2500 describes orifice 2535 that is configured to allow fluid flow exit therefrom. First lip 2500 is connected to first neck 2400 at first distal end 2420, and at second distal end 2425, first neck 2400 is connected to second fluid-holding and measuring chamber 2700. Second distal end 2425 is connected to second fluid-holding and measuring chamber 2700 in a manner that allows fluid flow out of second fluid-holding and measuring chamber 2700 and into second distal end 2425.

First fluid-holding and measuring chamber 2600 has at least one visible fixed marking 2605 indicating a specified volume of fluid within first chamber 2600. In embodiments, first fluid-holding and measuring chamber 2600 is translucent to an extent that allows a user to see the amount of liquid therein, which is what allows a user to measure the height of the liquid against the at least one visible fixed marking 2605 and determine the measured amount of liquid in chamber 2600.

Second fluid-holding and measuring chamber 2700 has at least one visible fixed marking 2705 indicating a specified volume of fluid within second chamber 2700. In embodiments, second fluid-holding and measuring chamber 2700 is translucent to an extent that allows a user to see the amount of liquid therein, which is what allows a user to measure the height of the liquid against the at least one visible fixed marking 2705 and determine the measured amount of liquid in chamber 2700.

In embodiments, first chamber 2600 has a greater volume than second chamber 2700.

Fluid conduit 2800 provides a fluid-flow path from the base of first fluid-holding and measuring chamber 2600 and into side-fluid-flow entry orifice 2435 of first neck 2400. Upon fluid entering into first neck 2400 via side-fluid-flow entry orifice 2435, fluid falls through first neck 2400 and into second fluid-holding and measuring chamber 2700. Fluid conduit 2800 has three portions: first curved distal-end portion 2805, body portion 2810, and second curved distal-end portion 2835. In embodiments, fluid-conduit body portion 2810 is slightly non-linear and bends or curves off axis approximately 1°-4° relative to longitudinal axis 2825. By squeezing first chamber 2600, a user can force fluid to flow from first chamber 2600, through fluid conduit 2800, and into second fluid-holding and measuring chamber 2700 (via fluid falling from side-fluid-flow entry orifice 2435, through first neck 2400, and into second fluid-holding and measuring chamber 2700). By forcing fluid into second fluid-holding and measuring chamber 2700, a user may pre-measure an amount of fluid to be subsequently dispensed from first-lip orifice 2535 into capless fuel system 300.

In an embodiment, fluid-conduit body portion 2810 has a longitudinal axis 2825 that is substantially adjacent to and substantially parallel to at least 70% of a longitudinal length 2610 of an exterior side-edge portion of first chamber 2600.

In embodiments, fluid-conduit first curved distal-end portion 2805 curves approximately 90° relative to fluid-conduit linear-body portion longitudinal axis 2825. In embodiments, fluid-conduit second curved distal-end portion 2835 curves approximately 90° relative to the fluid-conduit linear-body portion longitudinal axis 2830.

Fluid-conduit first curved distal-end portion 2805 being connected to side-edge base portion of first chamber 2615 and the connection configured to allow fluid flow out of (the base of) first chamber 2600 and into the fluid-conduit first curved distal-end portion 2805. Fluid-conduit second curved distal-end portion 2835 being connected to first neck 2400 at side-fluid-flow entry orifice 2435 and configured to allow fluid flow out of fluid-conduit second curved distal-end portion 2835, into first neck 2400 via side-fluid-flow entry orifice 2435 (and then falling into second fluid-holding and measuring chamber 2700).

Second chamber 2700 connected to second distal end of the first neck 2425 and configured to allow fluid flow out of second chamber 2700 and into first neck 2425 to thereby allow fluid to flow out of the bottle via first neck and first lip 2500.

In embodiments, first neck 2400 has longitudinal axis 2430 that is substantially parallel to the fluid-conduit linear-body portion longitudinal axis 2825.

In embodiments, fuel-additive dispensing bottle has second lip 3100 connected to first distal end 3005 of second neck 3000, second lip 3100 defines a plurality of second-lip screw-cap threads. Second lip 3100 describes orifice 3110 that is configured to allow fluid flow entry into second lip 3100. Second neck 3000 is connected to first chamber 2600 and configured to allow fluid flow from second lip 3100, through second neck 3000, and into first fluid-holding and measuring chamber 2600.

Second Embodiment

A second embodiment, see FIGS. 1 and 15-26, is directed to fuel-additive dispensing bottle 100 that is used to dispense a pre-measured amount of liquid fuel additive (not shown) into capless fuel-tank system 300 having fluid-receiving aperture 315 and self-sealing mechanism 320 that is triggered by tabs 310. Bottle 100 has first neck 400 having a circumference 405, a first-neck exterior surface 410, and diameter 415. In embodiments, diameter 415 ranges from approximately 0.860 inches to approximately 1.004 inches. In other embodiments, diameter 415 ranges from approximately 0.750 inches to approximately 1.19 inches.

First lip 500 has circumference 505 and first lip 500 is connected to first distal end 420 of first neck 400, exterior portions of first lip 500 define screw-cap threading 510. Sections of screw-cap threading 510 are disrupted in a planar fashion so as to frame substantially planar thread disruptions 515 that have planar surfaces 520. In use, substantially planar thread disruptions 515 allow first neck 400 to be removed from capless fuel-tank system 300 without having screw-cap threading 510 get caught on one or more tabs 310 during removal; planar surfaces 520 prevent tabs 310 from catching on screw-cap threading 510 and instead planar surfaces 520 slide past tabs 310 during removal. In embodiments, each planar surface 520 has a greatest width (i.e., the width being in a direction that is axial or normal to a lengthwise direction of threading 510) that matches a width or diameter of a screw-cap thread 510 being disrupted. In embodiments, each flattened planar surface 520 has a longitudinal length 525 (i.e., the longitudinal length being in a direction that is substantially parallel to a lengthwise direction of threading 510) that extends along a length of screw-cap threading 510. In embodiments, and as shown in FIG. 14, flattened planar surface 520 has a longitudinal length 525 that that ranges, in terms of degrees 521 (see FIG. 14), from approximately 9° to 11° around first-lip circumference 505; in embodiments degrees 521 is approximately 10.2° around first-lip circumference 505. In embodiments, each consecutive substantially planar thread disruption 515 is respectively spaced around first lip 500 and apart from a next-closest substantially planar thread disruption 515 such that collectively, the substantially planar thread disruptions 515 may be aligned with tabs 310 of capless fuel-tank system 300 (see FIG. 26). In embodiments, substantially planar thread disruptions 515 are arranged at 90° intervals around first-lip circumference 505. In embodiments, a plurality of substantially planar thread disruptions 515 are spaced at regular intervals on threading 510.

First neck 400 and first lip 500 are configured for insertion into capless fuel system 300 via fluid receiving aperture 315, and upon initiating insertion, at least two substantially planar thread disruptions 515 align with tabs 310 such that tabs 310 are depressed without impeding entry of first lip 500 into fluid-receiving aperture 315.

In embodiments, substantially circular first lip 500 describes orifice 535 that is configured to allow fluid flow exit therefrom. First lip 500 is connected to first neck 400 at first distal end 420, and at second distal end 425, first neck 400 is connected to second fluid-holding and measuring chamber 700. Second distal end 425 is connected to second fluid-holding and measuring chamber 700 in a manner that allows fluid flow out of second fluid-holding and measuring chamber 700 and into second distal end 425.

First fluid-holding and measuring chamber 600 has at least one visible fixed marking 605 indicating a specified volume of fluid within first chamber 600. In embodiments, first fluid-holding and measuring chamber 600 is translucent to an extent that allows a user to see the amount of liquid therein, which is what allows a user to measure the height of the liquid against the at least one visible fixed marking 605 and determine the measured amount of liquid in chamber 600.

Second fluid-holding and measuring chamber 700 has at least one visible fixed marking 705 indicating a specified volume of fluid within second chamber 700. In embodiments, second fluid-holding and measuring chamber 700 is translucent to an extent that allows a user to see the amount of liquid therein, which is what allows a user to measure the height of the liquid against the at least one visible fixed marking 705 and determine the measured amount of liquid in chamber 700.

In embodiments, first chamber 600 has a greater volume than second chamber 700.

Fluid conduit 800 provides a fluid-flow path from the base of first fluid-holding and measuring chamber 600 and into second fluid-holding and measuring chamber 700. Fluid conduit 800 has three portions: first curved distal-end portion 805, body portion 810, and second curved distal-end portion 835. In embodiments, fluid-conduit body portion 810 is slightly non-linear and bends or curves off axis approximately 1°-4° relative to longitudinal axis 825. By squeezing first chamber 600, a user can force fluid to flow from first chamber 600, through fluid conduit 2800, and into second fluid-holding and measuring chamber 700. By forcing fluid into second fluid-holding and measuring chamber 700, a user may pre-measure an amount of fluid to be subsequently dispensed from first-lip orifice 535 into capless fuel system 300.

In an embodiment, fluid-conduit body portion 810 has a longitudinal axis 825 that is substantially adjacent to and substantially parallel to at least 70% of a longitudinal length 610 of an exterior side-edge portion of first chamber 600.

In embodiments, fluid-conduit first curved distal-end portion 805 curves approximately 90° relative to fluid-conduit linear-body portion longitudinal axis 825. In embodiments, fluid-conduit second curved distal-end portion 835 curves approximately 90° relative to the fluid-conduit linear-body portion longitudinal axis 830.

Fluid-conduit first curved distal-end portion 805 being connected to side-edge base portion of first chamber 615 and the connection configured to allow fluid flow out of (the base of) first chamber 600 and into the fluid-conduit first curved distal-end portion 805. Fluid-conduit second curved distal-end portion 835 being connected to second fluid-holding and measuring chamber 700 and configured to allow fluid flow out of fluid-conduit second curved distal-end portion 835 into second fluid-holding and measuring chamber 700.

Second chamber 700 connected to second distal end of the first neck 425 and configured to allow fluid flow out of second chamber 700 and into first neck 425 to thereby allow fluid to flow out of the bottle via first neck and first lip 500.

In embodiments, first neck 400 has longitudinal axis 430 that is substantially parallel to the fluid-conduit linear-body portion longitudinal axis 825.

In embodiments, fuel-additive dispensing bottle has second lip 1100 connected to first distal end 1005 of second neck 1000, second lip 1100 defines a plurality of second-lip screw-cap threads. Second lip 1100 describes orifice 1110 that is configured to allow fluid flow entry into second lip 3100. Second neck 1000 is connected to first chamber 600 and configured to allow fluid flow from second lip 1100, through second neck 1000, and into first fluid-holding and measuring chamber 600.

The invention claimed is:

1. A fuel-additive dispensing bottle used to dispense a liquid fuel additive into a capless fuel-tank system having a self-sealing mechanism triggered by tabs, the bottle comprising:

- a first neck having a circumference, an exterior surface, and an outside diameter between approximately 0.750 inches to approximately 1.19 inches;
- a first lip having a circumference, the first lip connected to a first distal end of the first neck, the first lip defining screw-cap threading configured for use with a capless fuel-tank system having a self-sealing mechanism triggered by tabs,
  - wherein sections of the screw-cap threading are disrupted with a plurality of substantially planar thread disruptions, the plurality of substantially planar thread disruptions being positioned at regular intervals on the threading;
- the first neck and first lip configured for insertion into a capless fuel system having a self-sealing mechanism triggered by tabs;
- the first lip describing an orifice configured to allow fluid flow exit therefrom;
- a first fluid-holding and measuring chamber, wherein the first chamber has at least one visible fixed marking indicating a specified volume of fluid within the first chamber;
- a second fluid-holding and measuring chamber, wherein the second chamber has at least one visible fixed marking indicating a specified volume of fluid within the second chamber;

the first chamber having a greater volume than the second chamber;

a fluid conduit that provides a fluid-flow path from the first chamber to a side-fluid-flow entry orifice on the first neck, the fluid conduit having three portions: a first curved distal-end portion, a body portion, and a second curved distal-end portion, wherein the fluid-conduit body portion has a longitudinal axis that is substantially adjacent to and substantially parallel to at least 70% of a longitudinal length of an exterior side-edge portion of the first chamber, wherein the fluid-conduit first curved distal-end portion curves 80° to 100° relative to the fluid-conduit linear-body portion longitudinal axis, wherein the fluid-conduit second curved distal-end portion curves 80° to 100° relative to the fluid-conduit linear-body portion longitudinal axis, the fluid-conduit first curved distal-end portion being connected to a side-edge base portion of the first chamber and configured to allow fluid flow out of the first chamber and into the fluid-conduit first curved distal-end portion;

the fluid-conduit second curved distal-end portion connected to the first neck at a side-fluid-flow entry orifice and configured to allow fluid flow out of fluid-conduit second curved distal-end portion and into the first neck;

the second chamber connected to a second distal end of the first neck and configured to allow fluid flow out of the second chamber and into the first neck;

the first neck having a longitudinal axis that is substantially parallel to the fluid-conduit linear-body portion longitudinal axis; and a second lip connected to a first distal end of a second neck, the second lip defining screw-cap threading, the second lip describing an orifice configured to allow fluid flow entry into the second lip; and the second neck connected to the first chamber and configured to allow fluid flow from the second neck into the first chamber.

2. The fuel-additive dispensing bottle used to dispense a liquid fuel additive into a capless fuel-tank system having a self-sealing mechanism triggered by tabs of claim 1, wherein the capless fuel-tank system is a diesel capless fuel-tank system.

3. The fuel-additive dispensing bottle used to dispense a liquid fuel additive into a capless fuel-tank system having a self-sealing mechanism triggered by tabs of claim 1, wherein the fluid-conduit body portion is non-linear.

4. The fuel-additive dispensing bottle used to dispense a liquid fuel additive into a capless fuel-tank system having a self-sealing mechanism triggered by tabs of claim 3, wherein the fluid-conduit body portion bends or curves off axis approximately 1°-4° relative to a fluid-conduit body-portion longitudinal axis.

5. A fuel-additive dispensing bottle used to dispense a liquid fuel additive into a capless fuel-tank system having a self-sealing mechanism triggered by tabs, the bottle comprising:

a first neck having a circumference, an exterior surface, and an outside diameter between approximately 0.750 inches to approximately 1.19 inches;

a first lip having a circumference, the first lip connected to a first distal end of the first neck, the first lip defining screw-cap threading, wherein sections of the screw-cap threading are disrupted with a plurality of substantially planar thread disruptions, the plurality of substantially planar thread disruptions being positioned at regular intervals on the threading;

the first neck and first lip configured for insertion into a capless fuel system having a self-sealing mechanism triggered by tabs;

the first lip describing an orifice configured to allow fluid flow exit therefrom;

a first fluid-holding and measuring chamber, wherein the first chamber has at least one visible fixed marking indicating a specified volume of fluid within the first chamber;

a second fluid-holding and measuring chamber, wherein the second chamber has at least one visible fixed marking indicating a specified volume of fluid within the second chamber;

the first chamber having a greater volume than the second chamber;

a fluid conduit that provides a fluid-flow path from the first chamber to the second chamber, the fluid conduit having three portions: a first curved distal-end portion, a body portion, and a second curved distal-end portion, wherein the fluid-conduit body portion has a longitudinal axis that is substantially adjacent to and substantially parallel to at least 70% of a longitudinal length of an exterior side-edge portion of the first chamber, wherein the fluid-conduit first curved distal-end portion curves 80° to 100° relative to the fluid-conduit linear-body portion longitudinal axis, wherein the fluid-conduit second curved distal-end portion curves 80° to 100° relative to the fluid-conduit linear-body portion longitudinal axis, the fluid-conduit first curved distal-end portion being connected to a side-edge base portion of the first chamber and configured to allow fluid flow out of the first chamber and into the fluid-conduit first curved distal-end portion;

the fluid-conduit second curved distal-end portion being connected to a side edge of the second chamber and configured to allow fluid flow out of the fluid-conduit second curved distal-end portion and into the second chamber;

the second chamber connected to a second distal end of the first neck and configured to allow fluid flow out of the second chamber and into the first neck;

the first neck having a longitudinal axis that is substantially parallel to the fluid-conduit linear-body portion longitudinal axis; and a second lip connected to a first distal end of a second neck, the second lip defining screw-cap threading, the second lip describing an orifice configured to allow fluid flow entry into the second lip; and the second neck connected to the first chamber and configured to allow fluid flow from the second neck into the first chamber.

6. The fuel-additive dispensing bottle used to dispense a liquid fuel additive into a capless fuel-tank system having a self-sealing mechanism triggered by tabs of claim 5, wherein the capless fuel-tank system is a diesel capless fuel-tank system.

7. The fuel-additive dispensing bottle used to dispense a liquid fuel additive into a capless fuel-tank system having a self-sealing mechanism triggered by tabs of claim 5, wherein the fluid-conduit second curved distal-end portion connects to the second chamber at a position on a side edge of the second chamber that is proximate to the second distal end of the first neck.

* * * * *